US012727032B2

(12) United States Patent
Lu et al.

(10) Patent No.: US 12,727,032 B2
(45) **Date of Patent: *Sep. 1, 2026**

(54) WIRELESS COMMUNICATION METHOD, NON-AP STA, AND AP

(71) Applicant: GUANGDONG OPPO MOBILE TELECOMMUNICATIONS CORP., LTD., Dongguan (CN)

(72) Inventors: Liuming Lu, Dongguan (CN); Lei Huang, Singapore (SG); Chaoming Luo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/270,156

(22) Filed: Jul. 15, 2025

(65) Prior Publication Data

US 2025/0344247 A1 Nov. 6, 2025

Related U.S. Application Data

(63) Continuation of application No. 18/600,519, filed on Mar. 8, 2024, which is a continuation of application No. PCT/CN2021/118364, filed on Sep. 14, 2021.

(51) Int. Cl.

| | |
|---|---|
| ***H04W 74/00*** | (2009.01) |
| ***H04W 74/04*** | (2009.01) |
| ***H04W 74/08*** | (2009.01) |
| ***H04W 74/0816*** | (2024.01) |
| ***H04W 74/0833*** | (2024.01) |

(52) U.S. Cl.

CPC ....... *H04W 74/0816* (2013.01); *H04W 74/04* (2013.01); *H04W 74/085* (2013.01); *H04W 74/0866* (2013.01)

(58) Field of Classification Search

CPC ............ H04W 74/0816; H04W 74/04; H04W 74/085; H04W 74/0866

See application file for complete search history.

(56) References Cited

U.S. PATENT DOCUMENTS 12,477,461 B2 * 11/2025 Xin .................. H04W 52/0216
2023/0026249 A1 1/2023 Chu et al.

(Continued)

FOREIGN PATENT DOCUMENTS

CN 107517502 A 12/2017

OTHER PUBLICATIONS

International Search Report and Written Opinion of the International Searching Authority regarding International Patent Application No. PCT/CN2021/118364, dated Apr. 28, 2022, with Translation provided by WIPO.

(Continued)

*Primary Examiner* — Khai M Nguyen
(74) *Attorney, Agent, or Firm* — Ladas & Parry, LLP

(57) ABSTRACT

A wireless communication method includes: determining, by a Non-AP STA, to perform channel access in one or more r-TWT service periods by using a first EDCA parameter, according to first information; and/or, determining, by the Non-AP STA, to perform channel access outside the one or more r-TWT service periods by using a second EDCA parameter, according to the first information; wherein the first information comprises at least one of: types of the one or more r-TWT service period, being a trigger-enable service period or a non-trigger-enable service period; a role of the Non-AP STA, being one of a r-TWT scheduled station and a r-TWT non-scheduled station; or whether the Non-AP STA is currently in a scheduled or non-scheduled r-TWT service period.

18 Claims, 6 Drawing Sheets

(56) References Cited

U.S. PATENT DOCUMENTS

2023/0087887 A1* 3/2023 Ajami ............... H04W 74/0808 370/329
2023/0269788 A1* 8/2023 Xia ..................... H04W 74/006 370/329
2024/0163916 A1* 5/2024 Ryu .................. H04W 74/0866
2024/0244656 A1* 7/2024 Baek ................. H04W 52/0248
2025/0039928 A1* 1/2025 Cherian ................ H04W 74/08
2025/0133631 A1* 4/2025 Ahn ...................... H04W 84/12

OTHER PUBLICATIONS

IEEE P802.11be ™M/D1.01, Draft Standard for Information technology- Telecommunications and information exchange between systems Local and metropolitan area networks- Specific requirements, IEEE P802.11be ™M/ D1.01; Jun. 2021; Part 11: Wireless LAN Medium Access Control (MAC) and Physical Layer (PHY) Specifications, Amendment 8: Enhancements for extremely high throughput (EHT).
Proposed Spec Text Restricted TWT; doc .: IEEE 802.11-20/1395r0, IEEE P802.11 Wireless LAN, Facebook et al.; Jan. 1, 2021.
Protected TWT Enhancement for Latency Sensitive Traffic; Proposal for Facebook Inc, Qualcomm Inc, Intel Corp, Broadcom Inc, MediaTek Inc, Huawei Meeting; Jul. 29, 2020.
Office Action issued by the USPTO for U.S. Appl. No. 18/600,519 mailed on Feb. 19, 2026.

* cited by examiner

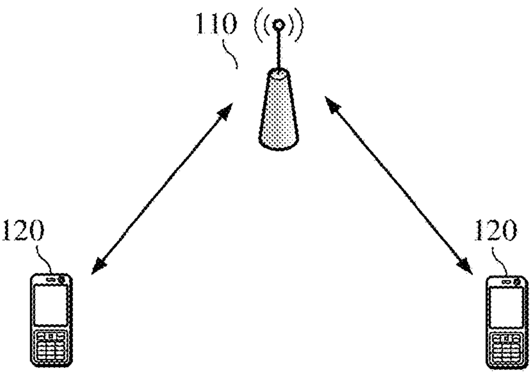

FIG. 1 determining, by the Non-AP STA, to perform channel access in the r-TWT service period by using the first EDCA parameter, according to the first information; and/or,
determining, by the Non-AP STA, to perform channel access outside the r-TWT service period by using the second EDCA parameter according to the first information;
wherein, the first information includes at least one of: the type of the r-TWT service period, being the trigger-enable service period or the non-trigger-enable service period;
a role of the Non-AP STA, being one of: the r-TWT scheduled station and the r-TWT non-scheduled station; or
whether the Non-AP STA is currently in the scheduled or non-scheduled r-TWT service period.

FIG. 2

| | EDCA parameter set information control | EDCA parameter set of the scheduled service period | EDCA parameter set outside the service period |
|---|---|---|---|
| byte: | 1 | 0 or 20 | 0 or 20 |

FIG. 3

| | EDCA parameter set presence in the scheduled service period | EDCA parameter set presence outside the scheduled service period | reserved |
|---|---|---|---|
| bit: | 1 | 1 | 6 |

FIG. 4

| | request type | TWT | nominal minimum wake time length of TWT | TWT wake interval mantissa | broadcast TWT information | restricted TWT flow information (optinal) | restricted TWT EDCA parameter set information (optinal) |
|---|---|---|---|---|---|---|---|
| byte: | 2 | 2 | 1 | 2 | 2 | 0 or 3 | 0 or 21 or 41 |

FIG. 5

| | Restricted TWT flow information presence | Restricted TWT EDCA parameter set info. presence | Reserved | Broadcast TWT identification | Broadcast TWT continue |
|---|---|---|---|---|---|
| Bit: | 1 | 1 | 1 | 5 | 8 |

FIG. 6

300 negotiating and determinIng, by the AP, the first EDCA parameter and/or the second EDCA parameter for the Non-AP STA with the Non-AP STA associated with the AP; wherein, the first EDCA parameter is configured for the Non-AP STA to perform channel access in the r-TWT service period, and the second EDCA parameter is configured for the Non-AP STA to perform channel access outside the r-TWT service period

400 sending, by the AP, the management frame to the Non-AP STA, wherein the management frame is configured to announce at least one of: the EDCA parameter of the r-TWT scheduled station in the r-TWT scheduled service period, the EDCA parameter of the r-TWT scheduled station outside the r-TWT scheduled service period, the EDCA parameter of the r-TWT non-scheduled station in the r-TWT non-scheduled service period, or the EDCA parameter of the r-TWT non-scheduled station outside the r-TWT service period.

500 performing, by the Non-AP STA, a first operation in the r-TWT service period, according to second information, wherein the first operation includes at least one of: executing a backoff process, pausing an execution of the backoff process, starting the backoff process, pausing a startup of the backoff process, stopping the execution of the backoff process, or stopping channel access; the second information includes at least one of: the type of the r-TWT service period, being the trigger-enable service period or the non-trigger-enable service period; the role of the Non-AP STA, being one of: the r-TWT scheduled station and the r-TWT non-scheduled station; or whether the Non-AP STA is currently in the scheduled or non-scheduled r-TWT service period.

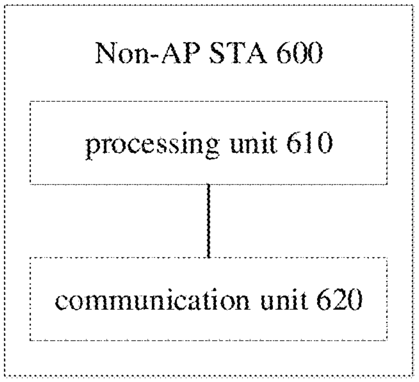

WIRELESS COMMUNICATION METHOD, NON-AP STA, AND AP

This application is a continuation application of U.S. application Ser. No. 18/600,519 filed on Mar. 8, 2024, which is a continuation application of PCT/CN2021/118364 filed Sep. 14, 2021, the disclosures of which are incorporated herein by reference in their entireties.

TECHNICAL FIELD

The present disclosure relates to the field of communication, and in particular to a wireless communication method and a device.

BACKGROUND

A target wake time (TWT) is introduced to allow an access point (AP) device to manage behaviors of a basic service set (BSS) to mitigate contentions among non-access point stations (Non-AP STAs), while the TWT has a scheduling feature of specifying a specific Non-AP STA to exchange frames at a service period (SP) according to time. However, other Non-AP STAs in the BSS may have an effect on that a Non-AP STA supporting low latency services performs timely frame exchange in a specified service period (SP).

SUMMARY OF THE DISCLOSURE

In a first aspect, the present disclosure provides a wireless communication method, and the method includes: determining, by a Non-AP STA, to perform channel access in a restricted TWT service period by using a first EDCA parameter, according to first information, and/or, determining, by the Non-AP STA, to perform channel access outside the restricted TWT service period by using a second EDCA parameter, according to the first information. The first information includes at least one of: a type of the restricted TWT service period, being a trigger-enable service period or a non-trigger-enable service period; a role of the Non-AP STA, being one of: a restricted TWT scheduled station and a restricted TWT non-scheduled station; or whether the Non-AP STA is currently in a scheduled or non-scheduled r-TWT service period.

In a second aspect, the present disclosure provides a Non-AP STA, including a processor and a memory. The memory is configured to store a computer program, and the processor is configured to call and run the computer program stored in the memory, to perform the method of the first aspect.

In a third aspect, the present disclosure provides an AP, including a processor and a memory. The memory is configured to store a computer program, and the processor is configured to call and run the computer program stored in the memory, to perform negotiating and determining a first enhanced distributed channel access (EDCA) parameter and/or a second EDCA parameter for a non-access point station (Non-AP STA) associated with the AP with the Non-AP STA; wherein the first EDCA parameter is configured for the Non-AP STA to perform channel access in one or more restricted target wake time (r-TWT) service periods, and the second EDCA parameter is configured for the Non-AP STA to perform channel access outside the one or more r-TWT service periods.

BRIEF DESCRIPTION OF THE DRAWINGS

FIG. 1 is a schematic diagram of a communication system architecture according to an embodiment of the present disclosure.

FIG. 2 is a schematic flow chart of a wireless communication method according to an embodiment of the present disclosure.

FIG. 3 is a schematic diagram of a restricted TWT EDCA parameter set information field according to an embodiment of the present disclosure.

FIG. 4 is a schematic diagram of an EDCA parameter set information control field according to an embodiment of the present disclosure.

FIG. 5 is a schematic diagram of a broadcast TWT parameter set field according to an embodiment of the present disclosure.

FIG. 6 is a schematic diagram of a broadcast TWT information field according to an embodiment of the present disclosure.

FIG. 8 is another schematic flow chart of a wireless communication method according to an embodiment of the present disclosure.

FIG. 9 is still another schematic flow chart of a wireless communication method according to an embodiment of the present disclosure.

FIG. 10 is still another schematic flow chart of a wireless communication method according to an embodiment of the present disclosure.

FIG. 11 is a structural schematic view of a Non-AP STA according to an embodiment of the present disclosure.

FIG. 12 is a structural schematic view of an AP according to an embodiment of the present disclosure.

FIG. 13 is another structural schematic view of an AP according to an embodiment of the present disclosure.

FIG. 14 is another structural schematic view of a Non-AP STA according to an embodiment of the present disclosure.

DETAILED DESCRIPTION

Figure 7:
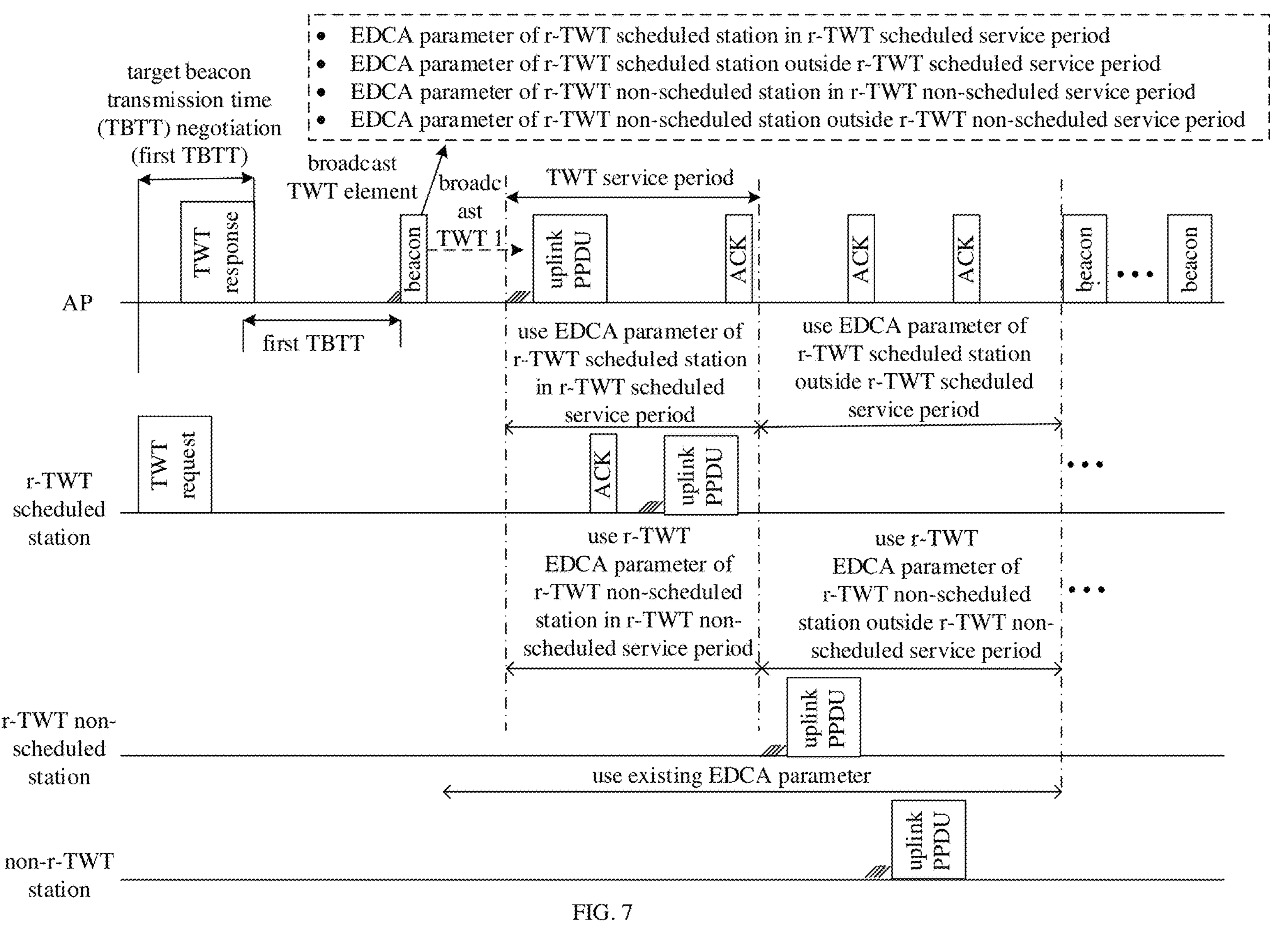
FIG. 7 is a schematic diagram of channel access based on EDCA parameter adjustment according to an embodiment of the present disclosure.

The technical solutions in the embodiments of the present disclosure will be described below in combination with accompanying drawings in the embodiments of the present disclosure. Obviously, the described embodiments are part in the embodiments of the present disclosure, but not all of the embodiments. Based on the embodiments in the present disclosure, all other embodiments obtained by those skilled in the art fall within a protection scope of the present disclosure.

The technical solutions in the embodiments of the present disclosure can be applied to various communication systems, such as wireless local area networks (WLAN), wireless fidelity (Wi-Fi), or other communication systems.

In some embodiments, a communication system 100 that the embodiments of the present disclosure applied to is as shown in FIG. 1. The communication system 100 may include an access point (AP) 110 and a non-access point station (Non-AP STA) 120 accessing a network through the AP 110.

In some scenarios, the AP can be referred to an AP STA, that is, the AP is also a station (STA) in a sense. In some scenarios, a STA is also referred to a Non-AP STA.

In some embodiments, the STA may include an AP STA and a Non-AP STA.

Communication in the communication system 100 may be communication between the AP and the Non-AP STA, communication between the Non-AP STA and the Non-AP STA, or communication between the STA and a peer STA. The peer STA can refer to a device communicates with the STA peer-to-peer, for example, the peer STA may be the AP or the Non-AP STA.

The AP is equivalent to a bridge connecting a wired network and a wireless network. The main function of the AP is to connect various wireless network clients together and connect the wireless network to Ethernet. An AP device can be a terminal device (such as a mobile phone) with a Wi-Fi chip or a network device (such as a router).

It should be understood that the role of the STA in the communication system is not absolute. For example, in some scenarios, when the mobile phone is connected to a router, the mobile phone is the Non-AP STA, and when the mobile phone is a hotspot for other mobile phones, the mobile phone acts as the AP.

The AP and the Non-AP STA may be devices applied in the Internet of Vehicles, Internet of things (IoT) nodes and sensors in the IoT, smart cameras, smart remote controllers, and smart water meters in smart homes, and sensors in smart cities.

In some embodiments, the Non-AP STA can support 802.11be standards. The Non-AP STA can also support various WLAN standards of 802.11 family at current or in future, such as 802.11ax, 802.11ac, 802.11n, 802.11g, 802.11b, and 802.11a.

In some embodiments, the AP can be a device that supports the 802.11be standards. The AP can also be a device that supports various WLAN standards of the 802.11 family at current or in future, such as 802.11ax, 802.11ac, 802.11n, 802.11g, 802.11b, and 802.11a.

In some embodiments, the AP 110 and/or the Non-AP STA 120 may be deployed on land, including indoors or outdoors, handheld, wearable, or vehicle-mounted; may also be deployed on water (e.g., ships); and still may be deployed in the air (such as aircraft, balloons, satellites, etc.).

In the embodiments of the present disclosure, the Non-AP STA 120 may be a mobile phone or a pad that supports WLAN/Wi-Fi technology, a computer, a virtual reality (VR), or an augmented reality (AR) with wireless transceiver function, a wireless device or a set-top box in industrial control, a wireless device or an in-vehicle communication device in self driving, a wireless device in remote medical, a wireless device in smart grid, a wireless device in transportation safety, a wireless device in smart city, or a wireless device, a wireless communication chip, a wireless communication application specific integrated circuit (ASIC), or a wireless communication system on chip (SOC) in smart home.

As an example without limitation, in the embodiments of the present disclosure, the Non-AP STA 120 may also be a wearable device. The wearable device can also be called wearable smart device, the wearable device is a general term for applying wearable technology to intelligently design daily wear and develop wearable devices, such as glasses, gloves, watches, clothing, and shoes. The wearable device is a portable device that is worn directly on the body or integrated into the user's clothing or accessories. The wearable device is not only a hardware device, but also has powerful functions by software support, data interaction and cloud interaction. Generalized wearable smart devices include characteristics of full functions, large size, and can achieve complete or partial functions without relying on smart phones, such as smart watches or smart glasses, and only focus on certain types of applications and needs to be used in conjunction with other devices such as smart phones, such as various types of smart bracelets and smart jewelry for vital signs monitoring.

Frequency bands supported by WLAN technology may include, but are not limited to, low frequency bands (including 2.4 GHz, 5 GHz, and 6 GHz) and high frequency bands (including 60 GHz).

FIG. 1 illustrates one AP and two Non-AP STAs. In some embodiments, the communication system 100 may include a plurality of APs and other numbers of Non-AP STAs, the number of the AP or the Non-AP STA is not limited in the embodiments of the present disclosure.

It should be understood that the device having communication function such as network/system in the embodiments of the present disclosure can be called a communication device. Taking the communication system 100 shown in FIG. 1 as an example, the communication device may include the AP 110 and the Non-AP STA 120 having communication function, and the AP 110 and the Non-AP STA 120 can be devices described above, and will not be repeated here. The communication device may further include other devices in the communication system 100, such as other network entities such as network controllers and gateways, and will not be limited in the embodiment of the present disclosure.

It should be understood that terms "system" and "network" are often used interchangeably in the present disclosure. The term "and/or" in the present disclosure is only an association relationship that describes associated objects, indicating that there may be three kinds of relationships, for example, A and/or B may indicate that there are three cases: A exists alone, A and B exist at the same time, and B exists alone. In addition, the character "/" in the present disclosure generally indicates that relationship between a preceding object and a following object of the "/" is the preceding object or the following object.

It should be understood that the "indication" mentioned in the embodiments of the present disclosure may be a direct indication, an indirect indication, or an indication of a related relationship. For example, A indicates B, which can indicate that A directly indicates B, such as B may be obtained through A; can also indicate that A indirectly indicates B, such as A indicates C, and B may be obtained through C; and can also indicate that A and B have an association relationship.

Terminologies used in embodiments of the present disclosure are used only to explain some embodiments of the present disclosure and are not intended to limit the present disclosure. Terms "first", "second", "third, "fourth", etc. in the description, claims, and the accompanying drawings of the present disclosure are used to distinguish different objects and are not used to describe a particular order. In addition, terms "comprise" and "have", as well as any variations of them, are intended to cover non-exclusive inclusions.

Descriptions in the embodiments of the present disclosure, the term "corresponding" may indicate that there is a direct corresponding or indirect corresponding relationship between the two, may also indicate that there is an association relationship between the two, or may also be a relationship of one can indicate and the other one can be instructed, one can configure and the other one can be configured, etc.

In the embodiments of the present disclosure, "predefined" or "pre-configured" may be realized by pre-storing corresponding codes, tables or other manners that can be used to indicate relevant information in a device (such as the STA and the network device), and the present disclosure does not limit the implementation manner. For example, a predefinition may refer to what is defined in a protocol.

In the embodiments of the present disclosure, the "protocol" may refer to a standard protocol in the communication field, for example, which may include a Wi-Fi protocol and related protocols applied to a future Wi-Fi communication system, which is not limited in the present disclosure.

In order to facilitate understanding of the technical solutions in the embodiments of the present disclosure, the technical solutions of the present disclosure are described in detail by the embodiments. Current technologies may be arbitrarily combined with the technical solutions in the embodiments of the present disclosure as optional solutions, and all of them fall within the protection scope in the embodiments of the present disclosure. The embodiments of the present disclosure include at least some of the following content.

The wireless device supports multi-band communication, for example, simultaneously communicating on 2.4 GHz band, 5 GHz band, 6 GHz band, and 60 GHz band, or simultaneously communicating on different channels in the same band (or different bands), improving communication throughput and/or reliability between devices. The device is generally called multi-band device, or multi-link device (MLD), and sometimes called multi-link entity or multi-band entity. The multi-link device may be an access point device or a station device. When the multi-link device being the access point device, the multi-link device includes one or more APs; when the multi-link device being a station device, the multi-link device includes one or more Non-AP STAs.

The multi-link device including one or more APs may be called AP MLD, the multi-link device including one or more Non-AP STAs may be called Non-AP MLD. In embodiments, the Non-AP MLD may be called STA MLD.

In embodiments, the AP MLD may include a plurality of APs, the Non-AP MLD may include a plurality of STAs, and a plurality of links can be formed between the APs in the AP MLD and the STAs in the Non-AP MLD. Data communication may be performed between the AP in the AP MLD and the corresponding STA in the Non-AP MLD through corresponding links.

In order to facilitate understanding of the technical solutions in the embodiments of the present disclosure, a target wake time (TWT) timing wake-up mechanism related to the present disclosure will be described below.

The TWT timing wake-up mechanism is configured to support energy saving work in large-scale Internet of things environments. For example, the TWT mechanism supports trigger-based uplink transmissions, thereby extending the scope of TWT operation.

In the TWT, a schedule (agreed between the Non-AP STA and the AP) is established between the Non-AP STA and the AP, and the schedule is composed of TWT time periods. When the time period negotiated by the Non-AP STA and the AP arrives, the Non-AP STA wakes up, waits for a trigger frame sent by the AP, and performs a data exchange. When a transmission is completed, the Non-AP STA returns to a sleep state. Each Non-AP STA can negotiate independently with the AP, and each Non-AP STA has a separate TWT time period.

The TWT allows the AP to manage behaviors of a basic service set (BSS) to mitigate contention between stations and reduce awake time of the stations in power management mode. This is achieved as the Non-AP STA operates in non-overlapping time and/or frequency domains and frame exchanges are concentrated in predefined service periods. Therefore, in order to ensure application effect of the TWT, the AP generally requires that all associated Non-AP STAs in the BSS can be added to the TWT so that the AP can perform scheduling. High-efficiency (HE) AP requests all associated Non-AP STAs that pronounce to support the TWT to participate in the TWT. After receiving an indication from the AP to join the TWT, the Non-AP STA should perform negotiation of an individual TWT protocol, or join a broadcast TWT. Additionally, a TWT service period (SP) includes a trigger-enable SP and a non-trigger-enable SP. A TWT scheduling AP performs scheduling by sending the trigger frame in the trigger-enable SP. At the same time, the TWT scheduled station cannot transmit frames to the TWT scheduling AP outside the broadcast TWT SP. In addition, in a trigger-enable broadcast TWT, the TWT scheduled station cannot transmit frames that do not carry an HE trigger-based physical layer protocol data unit (PPDU) (HE TB PPDU) to the TWT scheduling AP.

A restricted TWT (r-TWT) is based on the broadcast TWT. In a broadcast TWT operation, the TWT scheduling AP carries a broadcast TWT element in a beacon frame of broadcast to indicate a broadcast TWT service period (broadcast TWT SP). In the trigger-enable service period, after obtaining a channel access opportunity, the AP transmits the trigger frame or a downlink buffer unit (BU) to the TWT scheduled station (TWT scheduled STA).

The r-TWT allows the AP to use enhanced medium access protection and resource reservation mechanisms to provide more predictable and lower worst-case latency and jitter, and higher reliability for transmission of low-latency service. Currently, the r-TWT has mainly added two channel access rules in terms of channel access, which are: 1) the Non-AP STA with extremely high throughput (EHT) being a transmission opportunity (TXOP) owner, and when the TXOP is obtained outside the restricted TWT service period, it should be ensured that the TXOP ends before the start of any restricted TWT service period; and 2) the EHT AP schedules a quiet interval that overlaps with the restricted TWT service period to shield an operation of a legacy STA supporting a quiet element in the TWT SP, but the shielding operation within the quiet interval is invalid for an EHT Non-AP STA.

In order to facilitate understanding of the technical solutions in the embodiments of the present disclosure, technical problems to be solved by the present disclosure are described below.

1. The goal of the restricted TWT (r-TWT) is to provide a protected and reliable service period for transmission of low latency service, operation rules of the r-TWT at this stage do not specify that the Non-AP STA outside the TWT SP should be in a doze state or unable to transmit frames to the AP, and do not specify that a non-scheduled station (non-scheduled STA) must be in the doze state in the TWT SP. Therefore, a channel access method for each role of the Non-AP STA in or outside the SP lacks explicit differentiated definition of channel access rule.

2. At this stage, protections for the restricted TWT service period is not enough, and the following problems have not been solved: protection method of the quiet interval overlapping with the SP is not applied to some EHT STAs; how to restrict the channel access between the r-TWT non-scheduled station and the non-r-TWT station in the SP; how to ensure that the r-TWT scheduled station only send a low latency service flow of the r-TWT; and for a non-EHT STA that do not support the quiet element, how to avoid the non-EHT STA contending channel in the SP for an transmission opportunity.

3. How to solve fairness problem of access among stations in the BSS: for the r-TWT non-scheduled station and the non-r-TWT station, since the channel access is restricted in a specific SP, how to compensate for channel access rights of the r-TWT non-scheduled station and the non-r-TWT station is a problem to be solved.

Based on the above problems, the present disclosure provides a low latency service transmission solution, by setting different EDCA parameters and/or adjusting EDCA backoff rules to ensure the TWT scheduled station can perform the low latency service transmission of a specified AC or TID in a specific TWT service period, and at the same time, fairness of access of the stations in the BSS is considered.

The technical solutions of the present disclosure are described in detail below through some embodiments.

FIG. 2 is a schematic flow chart of a wireless communication method 200 according to the embodiments of the present disclosure. As shown in FIG. 2. The wireless communication method 200 may begin at block 210.

At block 210, the Non-AP STA determines to perform channel access in a r-TWT service period by using a first EDCA parameter, according to first information. And/or, the Non-AP STA determines to perform channel access outside the r-TWT service period by using a second EDCA parameter, according to the first information.

The first information includes at least one of: a type of the r-TWT service period, being a trigger-enable service period or a non-trigger-enable service period; a role of the Non-AP STA, being one of a r-TWT scheduled station and a r-TWT non-scheduled station; or whether the Non-AP STA is currently in a scheduled or non-scheduled r-TWT service period.

In some embodiments, in response to the role of the Non-AP STA being the r-TWT scheduled station, the first EDCA parameter is an EDCA parameter corresponding to the r-TWT scheduled station in the r-TWT service period, and the second EDCA parameter is an EDCA parameter corresponding to the r-TWT scheduled station outside the r-TWT service period. In response to the role of the Non-AP STA being the r-TWT non-scheduled station, the first EDCA parameter is an EDCA parameter corresponding to the r-TWT non-scheduled station in the r-TWT service period, and the second EDCA parameter is an EDCA parameter corresponding to the r-TWT non-scheduled station outside the r-TWT service period. Moreover, the first EDCA parameter corresponding to the r-TWT scheduled station is different from the first EDCA parameter corresponding to the r-TWT non-scheduled station, and the second EDCA parameter corresponding to the r-TWT scheduled station is different from the second EDCA parameter corresponding to the r-TWT non-scheduled station.

In some embodiments, the Non-AP STA may be, for example, the extremely high throughput (EHT) Non-AP STA, or other STA, such as the legacy STA (i.e., STA of previous generation), the present disclosure is not limit thereto.

In the embodiments of the present disclosure, the r-TWT scheduled station is a Non-AP STA that schedules a specific r-TWT service period (SP). The r-TWT non-scheduled station (non-scheduled STA) is a Non-AP STA that supports the r-TWT and is aware of the r-TWT service period (SP), but do not schedule a specific service period (SP).

In the embodiments of the present disclosure, according to whether the Non-AP STA is in a time interval of the restricted TWT (r-TWT) service period and the type of the r-TWT service period (including the trigger-enable service period and the non-trigger-enable service period), for different roles of the Non-AP STA (including the r-TWT scheduled station, the r-TWT non-scheduled station, and the non-r-TWT station), the Non-AP STA uses differentiated EDCA channel access mechanisms. In particular, by setting different EDCA parameters, it is ensured that the r-TWT scheduled station can perform the low latency service transmission of the specified access category (AC) or traffic identifier (TID) in the specific r-TWT service period, and at the same time, fairness of access of the stations in the BSS is also considered.

In some embodiments, the first EDCA parameter is represented by an EDCA parameter set element or a multi-user EDCA parameter set element, and/or, the second EDCA parameter is represented by the EDCA parameter set element or the multi-user EDCA parameter set element.

In some embodiments, in response to the role of the Non-AP STA being the r-TWT scheduled station, the Non-AP STA negotiates and determines the first EDCA parameter and/or the second EDCA parameter with the AP associated with the Non-AP STA in a process of r-TWT (membership) setup.

That is, the r-TWT scheduled station negotiates and determines a EDCA parameter to be used in the r-TWT service period and/or a EDCA parameter to be used outside the r-TWT service period with the AP associated with the r-TWT scheduled station in the process of r-TWT (membership) setup.

In some embodiments, the AP associated with the r-TWT scheduled station is a scheduling AP.

In some embodiments, in response to the role of the Non-AP STA being the r-TWT scheduled station, the Non-AP STA negotiates and determines the first EDCA parameter and/or the second EDCA parameter with the AP through a TWT request frame and/or a TWT response frame in the process of r-TWT (membership) setup.

For example, in the process of r-TWT (membership) setup, a field related to the EDCA parameter is added into a TWT element carried in the TWT request frame and/or the TWT response frame to be transmitted. In this way, the EDCA parameter to be used by the r-TWT scheduled station in the r-TWT service period and/or the EDCA parameter to be used by the r-TWT scheduled station outside the r-TWT service period is negotiated and determined by TWT protocol setup.

In some embodiments, the TWT element of the TWT request frame and/or the TWT response frame includes a first field configured to indicate the first EDCA parameter and/or a second field configured to indicate the second EDCA parameter.

In some embodiments, the TWT element of the TWT request frame and/or the TWT response frame further includes a third field including first identification information and second identification information. The first identification information is configured to indicate whether the first field is present in the TWT element, and the second identification information is configured to indicate whether the second field is present in the TWT element.

For example, the first identification information is an EDCA parameter set presence field (occupying 1 bit) of the scheduled service period, the second identification information is an EDCA parameter set presence field (occupying 1 bit) outside the service period.

In some embodiments, the first field is an EDCA parameter set field of the scheduled service period, the second field is an EDCA parameter set field outside the service period, and the third field is an EDCA parameter set information control field.

In some embodiments, the TWT element of the TWT request frame and/or the TWT response frame includes restricted TWT EDCA parameter set information fields. The restricted TWT EDCA parameter set information fields include the EDCA parameter set field of the scheduled service period, the EDCA parameter set field outside the service period, and the EDCA parameter set information control field.

For example, newly defined restricted TWT EDCA parameter set information fields are added in the TWT element of the TWT request frame and/or the TWT response frame. The restricted TWT EDCA parameter set information fields may include the EDCA parameter set information control field (occupying 1 byte), the EDCA parameter set field (occupying 0 or 20 bytes) of the scheduled service period, and the EDCA parameter set field (occupying 0 or 20 bytes) outside the service period, as shown in FIG. 3. The EDCA parameter set field of the scheduled service period indicates that the EDCA parameter set to be used by the r-TWT scheduled station in the r-TWT scheduled service period, which is represented by the EDCA parameter set element. The EDCA parameter set field outside the service period indicates that the EDCA parameter set to be used by the r-TWT scheduled station outside the r-TWT service period, which is represented by the EDCA parameter set element.

For example, the EDCA parameter set information control fields includes the EDCA parameter set presence field (occupying 1 bit) of the scheduled service period, the EDCA parameter set presence field (occupying 1 bit) outside the scheduled service period, and a reserved field (occupying 6 bit), as shown in FIG. 4. A field "EDCA parameter set presence of the scheduled service period" indicates whether a field "EDCA parameter set of the scheduled service period" is present in the restricted TWT EDCA parameter set information field, which has, for example, a value "1" representing presence and a value "0" representing absence, or the value "1" representing absence and the value "0" representing presence. A field "EDCA parameter set existence outside the service period" indicates whether a field "EDCA parameter set outside the service period" is present in the restricted TWT EDCA parameter set information field, which has, for example, a value "1" representing presence and a value "0" representing absence, or the value "0" representing presence and the value "1" representing absence.

In some embodiments, the TWT element of the TWT request frame and/or the TWT response frame includes a fourth field, configured to indicate the first EDCA parameter and/or the second EDCA parameter.

In some embodiments, the TWT element of the TWT request frame and/or the TWT response frame includes a fifth field, including third identification information, and the third identification information is configured to indicate whether the fourth field is present in the TWT element.

In some embodiments, the fourth field is the restricted TWT EDCA parameter set information fields, and the fifth field is a broadcast TWT information field. The TWT element of the TWT request frame and/or the TWT response frame includes a broadcast TWT parameter set field, and the broadcast TWT parameter set field includes the restricted TWT EDCA parameter set information fields and the broadcast TWT information field.

For example, the restricted TWT EDCA parameter set information fields (occupying 0 or 21 or 41 bytes) is added in the broadcast TWT parameter set field of the TWT element of the TWT request frame and/or the TWT response frame. The restricted TWT EDCA parameter set information fields are configured to indicate a EDCA parameter set which the r-TWT scheduled station uses in the r-TWT scheduled service period, and/or, a EDCA parameter set which the r-TWT scheduled station uses outside the r-TWT service period, as shown in FIG. 5.

For example, a restricted TWT EDCA parameter set information presence field (occupying 1 bit) is added in the broadcast TWT information field included in the broadcast TWT parameter set field of the TWT element of the TWT request frame and/or the TWT response frame. The restricted TWT EDCA parameter set information presence field is configured to indicate whether a "restricted TWT EDCA parameter set information" domain is present in the broadcast TWT parameter set field, which has, for example, a value "1" representing presence and the value "0" representing absence, or the value "0" representing presence and "1" representing absence, as shown in FIG. 6.

It should be noted that in some embodiments, "field" may be also be replaced with "domain", which is not limited in the present disclosure.

In some embodiments, in response to the role of the Non-AP STA being the r-TWT scheduled station, or, the role of the Non-AP STA being the r-TWT non-scheduled station, the Non-AP STA receives a management frame sent by the AP associated with the Non-AP STA, wherein the management frame is configured to announce the first EDCA parameter and/or the second EDCA parameter.

In some embodiments, the AP associated with the r-TWT scheduled station is the scheduling AP, and the AP associated with the r-TWT non-scheduled station is the scheduling AP.

In some embodiments, the management frame includes at least one of: a specified beacon frame, a probe response frame, or an association response frame.

For example, the probe response frame or the association response frame may indicate an acknowledgement (ACK).

For example, through the management frame (including the specified beacon frame, the probe response frame, and the association response frame), the access point (AP) announce: EDCA parameters of the r-TWT scheduled station in the r-TWT scheduled service period (r-TWT-Scheduled-SP-EDCA-Parameters), and/or, EDCA parameters of the r-TWT scheduled station outside the r-TWT service period (r-TWT-Scheduled-non-SP-EDCA-Parameters), and/or, EDCA parameters of the r-TWT non-scheduled station in the r-TWT non-scheduled service period (r-TWT-non-Scheduled-SP-EDCA-Parameters), and/or, EDCA parameters of the r-TWT non-scheduled station outside the r-TWT non-scheduled service period (r-TWT-non-Scheduled-non-SP-EDCA-Parameters). each type of EDCA parameter can be represented by a EDCA parameter set element or a multi-user EDCA parameter set element (MU EDCA parameter set element), and a corresponding EDCA parameter type is indicated in the management frame.

As shown in FIG. 7, related EDCA parameters are announced by a beacon.

In some embodiments, a management information base (MIB) attribute variable is maintained by the Non-AP STA in a MIB, and includes at least one of: a MIB attribute variable of an EDCA parameter value in the r-TWT scheduled service period when being the r-TWT scheduled station, a MIB attribute variable of the EDCA parameter value outside the r-TWT scheduled service period when being the r-TWT scheduled station, a MIB attribute variable of an EDCA parameter value in the r-TWT non-scheduled service period when being the r-TWT non-scheduled station, or a MIB attribute variable of the EDCA parameter value outside the r-TWT non-scheduled service period when being the r-TWT non-scheduled station.

In some embodiments, the Non-AP STA updates the MIB attribute variable maintained in the MIB according to a received EDCA parameter. For example, in response to the Non-AP STA receiving the EDCA parameter of the r-TWT scheduled station in the r-TWT scheduled service period, the Non-AP STA updates the MIB attribute variable of the EDCA parameter value in the r-TWT scheduled service period when being the r-TWT scheduled station; and/or, in response to the Non-AP STA receiving the EDCA parameter of the r-TWT scheduled station outside the r-TWT scheduled service period, the Non-AP STA updates the MIB attribute variable of the EDCA parameter value outside the r-TWT scheduled service period when being the r-TWT scheduled station; and/or, in response to the Non-AP STA receiving the EDCA parameter of the r-TWT non-scheduled station in the r-TWT non-scheduled service period, the Non-AP STA updates the MIB attribute variable of the EDCA parameter value in the r-TWT non-scheduled service period when being the r-TWT non-scheduled station; and/or, in response to the Non-AP STA receiving the EDCA parameter of the r-TWT non-scheduled station outside the r-TWT non-scheduled service period, the Non-AP STA updates the MIB attribute variable of the EDCA parameter value outside the r-TWT non-scheduled service period when being the r-TWT non-scheduled station.

For example, among Non-AP STAs associated with the access point (AP), stations that support the r-TWT and related EDCA parameter update operations maintain one or more of the following MIB attribute variable in the MIB. After receiving the latest related EDCA parameter set from the management frame, the related EDCA parameter set carried in the management frame is used to update a value of the EDCA attribute variable in the corresponding MIB.

For example, dot11rTWT scheduledSPEDCATable, which is configured for the Non-AP STA to be saved as the MIB attribute variable of the EDCA parameter value in the r-TWT scheduled service period when being the r-TWT scheduled station, and is updated by the Non-AP STA performs based on the latest received r-TWT-Scheduled-SP-EDCA-Parameters.

For another example, dot11rTWT schedulednonSPEDCATable, which is configured for the Non-AP STA to be saved as the MIB attribute variable of the EDCA parameter value outside the r-TWT service period when being the r-TWT scheduled station, and is updated by the Non-AP STA based on the latest received r-TWT-Scheduled-non-SP-EDCA-Parameters.

For another example, dot11rTWTnonScheduledSPEDCATable, which is configured for the Non-AP STA to be saved as the MIB attribute variable of the EDCA parameter value in the r-TWT non-scheduled service period when being the r-TWT non-scheduled station, and is updated by the Non-AP STA based on the latest received r-TWT-non-Scheduled-SP-EDCA-Parameters.

For another example, dot11rTWTnonSchedule- dnonSPEDCATable, which is configured for the Non-AP STA to be saved as the MIB attribute variable of the EDCA parameter value outside the r-TWT non-scheduled service period when being the r-TWT non-scheduled station, and is updated by the Non-AP STA based on the latest received r-TWT-non-Scheduled-non-SP-EDCA-Parameters.

In some embodiments, the Non-AP STA determines which EDCA parameter set to use according to the current role of the Non-AP STA and whether the Non-AP STA is currently in the r-TWT scheduled service period or the r-TWT non-scheduled service period.

For example, when being the r-TWT scheduled station, when a starting point of the r-TWT scheduled service period arrives, the Non-AP STA sets a value of a current EDCA operation parameter or state variable (including a CWmin[AC], a CWmax[AC], and an AIFSN[AC]) to be a value corresponding to the dot11rTWTscheduledSPEDCATable, until the r-TWT scheduled service period ends. When the r-TWT scheduled service period ends, the value of the current EDCA operation parameter or state variable (including the CWmin[AC], the CWmax[AC], and the AIFSN[AC]) is set to a value corresponding to the dot11rTWTschedulednonSPEDCATable, until a starting point of a next r-TWT service period. When the next r-TWT service period is the r-TWT non-scheduled service period, the value of the current EDCA operation parameter or state variable (including the CWmin[AC], the CWmax[AC], and the AIFSN[AC]) is set to to be a value corresponding to the dot11rTWTnonScheduledSPEDCATable.

For another example, when being the r-TWT non-scheduled station, a starting point of the r-TWT non-scheduled service period arrives, the Non-AP STA sets the value of the current EDCA operation parameter or state variable (including the CWmin[AC], the CWmax[AC], and the AIFSN[AC]) to be a value corresponding to the dot11rTWTnonScheduledSPEDCATable, until the r-TWT non-scheduled service period ends. When the r-TWT non-scheduled service period ends, the value of the current EDCA operation parameter or state variable (including the CWmin[AC], the CWmax[AC], and the AIFSN[AC]) is set to be a value corresponding to the dot11rTWTnonSchedulednonSPEDCATable, until the starting point of the next r-TWT non-scheduled service period.

It should be noted, the CWmin[AC] represents a minimum value of a contention window associated with the AC; the CWmax[AC] represents a maximum value of the contention window associated with the AC; and the AIFSN[AC] represents the number of arbitration interframe spaces associated with the AC.

In some embodiments, in response to the role of the Non-AP STA being the r-TWT scheduled station and the type of the r-TWT service period being the trigger-enable service period, the first EDCA parameter is configured to: ensure that the Non-AP STA is unable or difficult to obtain a channel transmission opportunity through the EDCA channel access mechanism in the r-TWT service period; and/or, ensure that the AP associated with the Non-AP STA obtains an transmission opportunity through the EDCA channel access mechanism to schedule transmission of the Non-AP STA in the r-TWT service period; and/or, ensure that the AP associated with the Non-AP STA only schedules the low latency service flow of the AC or the TID corresponding to r-TWT in the r-TWT service period; or, ensure that the AP associated with the Non-AP STA preferentially schedules the low latency service flow of the AC or the TID corresponding to r-TWT in the r-TWT service period.

For example, for the EDCA parameter used in the trigger-enable service period, it is ensured that the r-TWT scheduled station is unable or difficult to obtain the channel transmission opportunity (TXOP) through the EDCA channel access mechanism. At the same time, it is ensured that the scheduling AP can easily obtain the transmission opportunity through the EDCA mechanism to schedule transmission of the r-TWT scheduled station, and that the scheduling AP only schedules the low latency service flow of the r-TWT specific AC/TID related to the r-TWT scheduled station or preferentially schedules the low latency service flow of the r-TWT specific AC/TID related to the r-TWT scheduled station.

In some embodiments, in response to the role of the Non-AP STA being the r-TWT scheduled station and the type of the r-TWT service period being the non-trigger-enable service period, the first EDCA parameter is configured to: ensure that the Non-AP STA obtains the channel transmission opportunity through the EDCA channel access mechanism only for the low latency service flow of the AC or the TID corresponding to r-TWT in the r-TWT service period; or, ensure that the Non-AP STA obtains the channel transmission opportunity through the EDCA channel access mechanism preferentially for the low latency service flow of the AC or the TID corresponding to r-TWT in the r-TWT service period.

For example, for the EDCA parameter used in the non-trigger-enable service period, it is ensured that the r-TWT scheduled station is only for the low latency service flow of the r-TWT specific AC/TID or preferentially for the low latency service flow of the r-TWT specific AC/TID, and obtains the channel transmission opportunity through channel access contention of the EDCA mechanism. That is, it is ensure that only a service flow of the specific AC/TID corresponding to the low latency service flow obtains the TXOP through the channel access contention of the EDCA mechanism, or it is preferentially ensured that the service flow of the specific AC/TID corresponding to the low latency service flow obtains the TXOP through the channel access contention of the EDCA mechanism.

In some embodiments, in response to the role of the Non-AP STA being the r-TWT scheduled station, the second EDCA parameter is configured to ensure that the Non-AP STA obtains the channel transmission opportunity through the EDCA channel access mechanism more difficult than a station that do not use the r-TWT service period to transmit, outside the r-TWT service period.

For example, for the EDCA parameter set outside the r-TWT service period, it is ensured that the r-TWT scheduled station obtains the channel transmission opportunity through the channel access contention of the EDCA mechanism more difficult than the station that do not use the service period to transmit, so as to ensure fairness of channel access of the stations in the BSS.

In some embodiments, in response to the role of the Non-AP STA being the r-TWT non-scheduled station, the first EDCA parameter is configured to ensure that the Non-AP STA is unable or difficult to obtain the channel transmission opportunity through the EDCA channel access mechanism in the r-TWT service period; or, the second EDCA parameter is configured to ensure that the Non-AP STA obtains the channel transmission opportunity through the EDCA channel access mechanism more easily than the r-TWT scheduled station outside the r-TWT service period.

For example, for the EDCA parameter used by the r-TWT non-scheduled station in the r-TWT service period, it is ensured that the r-TWT non-scheduled station is unable or difficult to obtain the channel transmission opportunity through the channel access contention of the EDCA mechanism.

For another example, for the EDCA parameter used by the r-TWT non-scheduled station outside the r-TWT service period, it is ensured that the r-TWT non-scheduled station obtains the channel transmission opportunity through the channel access contention of the EDCA mechanism more easily than the r-TWT scheduled station, so as to ensure fairness of channel access of the stations in the BSS.

In some embodiments, in response to the non-r-TWT station supporting the quiet element and being in a quiet state in the r-TWT service period, a EDCA parameter of the non-r-TWT station is configured to ensure that the non-r-TWT station obtains the channel transmission opportunity through the EDCA channel access mechanism more easily than the r-TWT scheduled station outside the r-TWT service period.

For example, in response to the non-r-TWT station supporting the quiet element and being in the quiet state in the r-TWT service period, for the EDCA parameter set by the non-r-TWT station, it is ensured that the non-r-TWT station obtains the channel transmission opportunity through the channel access contention of the EDCA mechanism outside the r-TWT service period more easily than the r-TW scheduled station, so as to ensure fairness of channel access of the stations in the BSS.

In the embodiments of the present disclosure, the non-r-TWT station is a Non-AP STA that un-supports the r-TWT or is unaware of the r-TWT service period (SP).

In some embodiments, in response to the non-r-TWT station un-supporting the quiet element or being in the quiet state in the r-TWT service period, and the non-r-TWT station supporting different EDCA parameters at different time intervals, an EDCA parameter of the non-r-TWT station is configured to: ensure that the non-r-TWT station is unable or difficult to obtain a channel transmission opportunity through a EDCA channel access mechanism in the r-TWT service period; and/or, ensure that the non-r-TWT station obtains the channel transmission opportunity through the EDCA channel access mechanism more easily than the r-TWT scheduled station outside the r-TWT service period.

For example, for the non-r-TWT station that un-supports the quiet element or is not in the quiet state during the r-TWT service period, and supports different EDCA parameters at different time intervals, in this case, the non-r-TWT station uses the following rules.

For the EDCA parameter set in the r-TWT service period, it is ensured that the non-r-TWT station is unable or difficult to obtain the channel transmission opportunity through the channel access contention of the EDCA mechanism. And/or, for the EDCA parameter set outside the r-TWT service period, it is ensured that the non-r-TWT station obtains the channel transmission opportunity through the channel access contention of the EDCA mechanism more easily than the r-TWT scheduled station, so as to ensure fairness of channel access of the stations in the BSS.

In some embodiments, in response to the non-r-TWT station un-supporting the quiet element or being in the quiet state in the r-TWT service period, and the non-r-TWT station supporting different EDCA parameters at different time intervals, the non-r-TWT station is prohibited from performing association access; or, the non-r-TWT station is prohibited from performing channel access through the EDCA channel access mechanism; or, the EDCA parameter of the non-r-TWT station is configured to ensure that the non-r-TWT station is difficult to obtain the channel transmission opportunity through the EDCA channel access mechanism in the r-TWT service period and outside the r-TWT service period; or, the EDCA parameter of the non-r-TWT station is configured to ensure that the non-r-TWT station is unable or more difficult to obtain the channel transmission opportunity through the EDCA channel access mechanism than the r-TWT scheduled station in the r-TWT service period; and/or, the EDCA parameter of the non-r-TWT station is configured to ensure that the non-r-TWT station obtains the channel transmission opportunity through the EDCA channel access mechanism more easily than the r-TWT scheduled station outside the r-TWT service period.

For example, for the non-r-TWT station that un-supports the quiet element or is not in the quiet state in the r-TWT service period, and the non-r-TWT station un-supports different EDCA parameters at different time intervals, in this case, the non-r-TWT station adopts one of rules: the non-r-TWT station is prohibited from association access; the non-r-TWT station is prohibited from performing channel access through the EDCA mechanism in the r-TWT; the non-r-TWT station is allowed to access, and a EDCA parameter is used to ensure that the non-r-TWT station is difficult to obtain the channel transmission opportunity through the channel access contention of the EDCA mechanism; and the non-r-TWT station is allowed to access, and a EDCA parameter is used to ensure that the non-r-TWT station is more difficult to obtain the channel transmission opportunity through the channel access contention of the EDCA mechanism in the r-TWT service period than the r-TWT scheduled station, at the same time, the non-r-TWT station is easier to obtain the channel transmission opportunity through the channel access contention of the EDCA mechanism outside the r-TWT service period than the r-TWT scheduled station.

In some embodiments, for the non-r-TWT station that is unaware of the r-TWT service period, including the station that un-supports the quiet element, the scheduling AP specifies a EDCA parameter to be used by the non-r-TWT station at a corresponding time interval of the service period before the r-TWT service period occurs, and/or, specifies a EDCA parameter to be used by the non-r-TWT station outside a corresponding time interval of the service period before or after the r-TWT service period occurs.

In some embodiments, the EDCA parameter of the non-r-TWT station is represented by the EDCA parameter set element or the multi-user EDCA parameter set element.

In some embodiments, the present disclosure only illustrates the channel access method based on the r-TWT service period for a single AP or a single station, and the solution in the present disclosure is also applicable to the multi-link device (MLD).

Therefore, in the embodiments of the present disclosure, the Non-AP STA determines to use the first EDCA parameter to perform channel access in the r-TWT service period according to the type of the r-TWT service period and the role of the Non-AP STA, and/or, the Non-AP STA determines to use the second EDCA parameter to preform channel access outside the r-TWT service period according to the type of the r-TWT service period and the role of the Non-AP STA. For example, by setting different EDCA parameters, it is ensured that the r-TWT scheduled station can perform low latency service transmission of the specified AC or TID in the specific r-TWT service period, and at the same time, fairness of access of the stations in the BSS is also considered.

The embodiments of the Non-AP STA side of the present disclosure is described in detail above in conjunction with FIG. 2 to FIG. 7, and the embodiments of the AP side of the present disclosure is described in detail below in conjunction with FIG. 8 and FIG. 9. It should be understood that the embodiments of the AP side and the embodiments of the Non-AP STA side correspond to each other, and similar descriptions may refer to the embodiments of the Non-AP STA side.

FIG. 8 is a schematic flow chart of the wireless communication method 300 according to the embodiment of the present disclosure. As shown in FIG. 8. The wireless communication method 300 may include at least part of contents of the following.

At block 310, the AP negotiates and determines the first EDCA parameter and/or the second EDCA parameter for a Non-AP STA associated with the AP with the Non-AP STA. The first EDCA parameter is configured for the Non-AP STA to perform channel access in the r-TWT service period, and the second EDCA parameter is configured for the Non-AP STA to perform channel access outside the r-TWT service period.

In some embodiments, the Non-AP STA is the r-TWT scheduled station.

In some embodiments, the AP negotiates and determines the first EDCA parameter and/or the second EDCA parameter for the Non-AP STA with the Non-AP STA through the TWT request frame and/or the TWT response frame in the process of r-TWT (membership) setup.

In some embodiments, the TWT element of the TWT request frame and/or the TWT response frame includes a first field configured to indicate the first EDCA parameter, and/or a second field configured to indicate the second EDCA parameter.

In some embodiments, the TWT element of the TWT request frame and/or the TWT response frame further includes a third field, including first identification information and second identification information. The first identification information is configured to indicate whether the first field is present in the TWT element, and the second identification information is configured to indicate whether the second field is present in the TWT element.

In some embodiments, the first field is the EDCA parameter set field of the scheduled service period, the second field is the EDCA parameter set field outside a service period, and the third field is the EDCA parameter set information control field.

In some embodiments, the TWT element of the TWT request frame and/or the TWT response frame includes restricted TWT EDCA parameter set information fields, including the EDCA parameter set field of the scheduled service period, the EDCA parameter set field outside the service period, and the EDCA parameter set information control field.

In some embodiments, the TWT element of the TWT request frame and/or the TWT response frame includes a fourth field, configured to indicate the first EDCA parameter and/or the second EDCA parameter.

In some embodiments, the TWT element of the TWT request frame and/or the TWT response frame includes a fifth field, including third identification information, and the third identification information is configured to indicate whether the fourth field is present in the TWT element.

In some embodiments, the fourth field is the restricted TWT EDCA parameter set information field, and the fifth field is the broadcast TWT information field. The TWT element of the TWT request frame and/or the TWT response frame includes the broadcast TWT parameter set fields, including the restricted TWT EDCA parameter set information field and the broadcast TWT information field.

In some embodiments, the first EDCA parameter is represented by the EDCA parameter set element or the multi-user EDCA parameter set element, and/or, the second EDCA parameter is represented by the EDCA parameter set element or the multi-user EDCA parameter set element.

Therefore, in the embodiments of the present disclosure, the AP negotiates and determines the first EDCA parameter and/or the second EDCA parameter for the Non-AP STA with the Non-AP STA associated with the AP. Consequently, the Non-AP STA determines to use first EDCA parameter to perform channel access in the r-TWT service period according to the type of the r-TWT service period and the role of the Non-AP STA, and/or, the Non-AP STA determines to use the second EDCA parameter to preform channel access outside the r-TWT service period according to the type of the r-TWT service period and the role of the Non-AP STA. For example, by setting different EDCA parameters, it is ensured that the r-TWT scheduled station can perform low latency service transmission of the specified AC or TID in the specific r-TWT service period, and at the same time, fairness of access of the stations in the BSS is also considered.

FIG. 9 is a schematic flow chart of the wireless communication method 400 according to the embodiment of the present disclosure. As shown in FIG. 9. The wireless communication method 400 may include at least part of contents of the following.

At block 410, the AP sends the management frame to a Non-AP STA, wherein the management frame is configured to announce at least one of: a EDCA parameter of the r-TWT scheduled station in a r-TWT scheduled service period, a EDCA parameter of the r-TWT scheduled station outside the r-TWT scheduled service period, a EDCA parameter of the r-TWT non-scheduled station in the r-TWT non-scheduled service period, or a EDCA parameter of the r-TWT non-scheduled station outside the r-TWT non-scheduled service period.

In some embodiments, the Non-AP STA is the r-TWT scheduled station, or the Non-AP STA is the r-TWT non-scheduled station.

In some embodiments, the management frame includes at least one of: the specified beacon frame, the probe response frame, or the association response frame.

In some embodiments, the EDCA parameter is represented by the EDCA parameter set element or the multi-user EDCA parameter set element.

Therefore, in the embodiments of the present disclosure, the AP sends the management frame to the Non-AP STA, and the management frame is configured to announce at least one of: the EDCA parameter of the r-TWT scheduled station in the r-TWT scheduled service period, the EDCA parameter of the r-TWT scheduled station outside the r-TWT scheduled service period, the EDCA parameter of the r-TWT non-scheduled station in the r-TWT non-scheduled service period, or the EDCA parameter of the r-TWT non-scheduled station outside the r-TWT non-scheduled service period. For example, by setting different EDCA parameters, it is ensured that the r-TWT scheduled station can perform low latency service transmission of the specified AC or TID in the specific r-TWT service period, and at the same time, fairness of access of the stations in the BSS is also considered.

FIG. 10 is a schematic flow chart of the wireless communication method 500 according to the embodiment of the present disclosure. As shown in FIG. 10, the wireless communication method 500 may include at least part of contents of the following.

At block 510, the Non-AP STA performs a first operation in the r-TWT service period, according to second information, wherein the first operation includes at least one of: executing a backoff process, pausing an execution of the backoff process, starting the backoff process, pausing a startup of the backoff process, stopping the execution of the backoff process, or stopping channel access. The second information includes at least one of: the type of the r-TWT service period, being the trigger-enable service period or the non-trigger-enable service period; the role of the Non-AP STA, being one of the r-TWT scheduled station and the r-TWT non-scheduled station; or whether the Non-AP STA is currently in the scheduled or non-scheduled r-TWT service period.

In some embodiments, the Non-AP STA may be, for example, the extremely high throughput (EHT) Non-AP STA, or other STA, such as the legacy STA (i.e., STA of previous generation), the present disclosure is not limited thereto.

In the embodiments of the present disclosure, the r-TWT scheduled station is the Non-AP STA that schedules the specific r-TWT service period (SP). The r-TWT non-scheduled station is the Non-AP STA that supports the r-TWT and is aware of the r-TWT service period (SP) but do not schedule the specific service period (SP).

In the embodiments of the present disclosure, rules related to an EDCA backoff process of the r-TWT scheduled station and the r-TWT non-scheduled station in the time interval of the restricted TWT (r-TWT) service period are defined to ensure that the r-TWT scheduled station can perform low latency service transmission of the specified AC or TID in the specific r-TWT service period. At the same time, fairness of access of the stations in the BSS is also considered.

In some embodiments, in response to the role of the Non-AP STA being the r-TWT scheduled station, the type of the r-TWT service period being the non-trigger-enable service period, and the r-TWT scheduled station being allowed to perform channel access based on an EDCA rule in the r-TWT service period, in this case, the block 310 may include the following.

For a first access category (AC), in response to a service data transmitted in the r-TWT service period being allowed to be empty in a transmission queue associated with the first AC, or a traffic identifier (TID) transmitted in the r-TWT service period being allowed to have no corresponding frame to be transmitted, the Non-AP STA pauses the startup or the execution of the backoff process, and in response to the service data transmitted in the r-TWT service period being allowed to be not empty in the transmission queue, or the traffic identifier (TID) transmitted in the r-TWT service period being allowed to have a corresponding frame to be transmitted, starting or executing the backoff process.

Or, for a second AC, the Non-AP STA pauses the startup or the execution of the backoff process in the r-TWT service period.

Or, for the second AC, in response to the service data transmitted in the r-TWT service period being allowed to be empty in a transmission queue associated with the first AC, or a traffic identifier (TID) transmitted in the r-TWT service period being allowed to have no corresponding frame to be transmitted, and the second AC has a data frame to be transmitted, the Non-AP STA starts or executes the backoff process; and/or in response to the service data transmitted in the r-TWT service period being allowed to be not empty in the transmission queue associated with the first AC, or the traffic identifier (TID) transmitted in the r-TWT service period being allowed to have a corresponding frame to be transmitted, the Non-AP STA pauses the startup or the execution of the backoff process for the second AC.

The first AC is an AC corresponding to a type of the service data that is allowed to be transmitted in the r-TWT service period (for example, the AC corresponding to the TID corresponding to the low latency service identified by the Non-AP STA may also be called a low latency service AC), and the second AC is an AC (may also be called non-low latency service AC) corresponding to a type of the service data that is not allowed to be transmitted in the r-TWT service period.

In some embodiments, the first AC is an AC corresponding to a low latency service, and the second AC is an AC corresponding to a non-low latency service.

In some embodiments, the TID allowed to be transmitted in the r-TWT service period is a TID corresponding to a specified low latency service in the process of r-TWT (membership) setup.

For example, for the AC corresponding to the service data type allowed to be transmitted in the r-TWT service period (for example, the AC corresponding to the traffic identifier (TID) corresponding to the low latency service identified by the Non-AP STA), when service data transmitted in the r-TWT service period is allowed to be empty in the transmission queue associated with the AC, or a TID transmitted in the r-TWT service period is allowed to have no corresponding frame to be transmitted, the r-TWT scheduled station pauses the startup or the execution of the backoff process, until the service data transmitted in the r-TWT service period is allowed to be empty in the transmission queue associated with the corresponding AC, or the TID transmitted in the r-TWT service period is allowed to have corresponding frame to be transmitted, the r-TWT scheduled station starts or executes the backoff process.

For example, for the AC corresponding to the service data type that are not allowed to be transmitted in the r-TWT service period (may also be called non-low latency service AC), one of the following backoff rules is adopted.

1. The startup or the execution of the backoff process is paused in the r-TWT service period.

2. The backoff process is started or executed, in response to the service data transmitted in the r-TWT service period being allowed to be empty in the transmission queue associated with the low latency service AC, or the TID transmitted in the r-TWT service period being allowed to have no corresponding frame to be transmitted, when the non-low latency service AC has a data frame to be transmitted. The startup or the execution of the backoff process is paused, when the service data transmitted in the r-TWT service period is allowed to be no empty in the transmission queue associated with the low latency service AC, or the TID transmitted in the r-TWT service period is allowed to have a corresponding frame to be transmitted for the non-low latency service AC.

In some embodiments, in response to the role of the Non-AP STA being the r-TWT non-scheduled station, and the type of the r-TWT service period being the non-trigger-enable service period, the Non-AP STA stops performing channel access based on the EDCA rule in the r-TWT service period, which includes: the Non-AP STA stops the backoff process in the r-TWT service period, or un-performs transmission to a wireless medium in the r-TWT service period by setting a corresponding network allocation vector (NAV).

For example, for the r-TWT non-scheduled station, the EDCA rule is stopped be performed for channel access in the r-TWT service period (SP). That is, the EDCA backoff process is stopped.

In some embodiments, in response to the role of the Non-AP STA being the r-TWT scheduled station, the type of the r-TWT service period being the trigger-enable service period, and the r-TWT scheduled station being not allowed to perform channel access based on the EDCA rule in the r-TWT service period, in this case, the block 310 may include: the Non-AP STA stops the backoff process in the r-TWT service period, and the Non-AP STA sends a trigger-based physical layer protocol data unit (PPDU) according to indication information of a trigger frame, when the Non-AP STA receives the trigger frame sent by the AP associated with the Non-AP STA.

For example, if the scheduled Non-AP STA is not allowed to perform the EDCA rule for channel access in the r-TWT service period (SP) (for example, which is a trigger-enable r-TWT service period), for the r-TWT scheduled station, the r-TWT scheduled station stops performing the EDCA rule for channel access. That is, the EDCA backoff process is stopped. At the same time, when receiving the trigger frame from an r-TWT scheduling AP, the trigger-based PPDU (TB PPDU) is sent based on the indication information of the trigger frame.

In some embodiments, in response to the role of the Non-AP STA being the r-TWT non-scheduled station, the Non-AP STA stops performing channel access based on the EDCA rule in the r-TWT service period, which includes that the Non-AP STA stops the backoff process in the r-TWT service period, or un-performs transmission to the wireless medium in the r-TWT service period by setting a corresponding NAV.

For example, for the r-TWT non-scheduled station, the EDCA rule is stopped to be performed for channel access in the service period (SP). That is, the EDCA backoff process is stopped.

In some embodiments, the backoff process is the EDCA backoff process.

In some embodiments, the present disclosure only illustrates the channel access method based on the r-TWT service period for a single AP or a single station, and the solution in the present disclosure is also applicable to the multi-link device (MLD).

Therefore, in the embodiments of the present disclosure, the Non-AP STA performs the backoff process in the r-TWT service period according to the type of the r-TWT service period and the role of the Non-AP STA. For example, by adjusting the EDCA backoff rule, it is ensured that the r-TWT scheduled station can perform low latency service transmission of the specified AC or TID in the specific r-TWT service period, and at the same time, fairness of access of the stations in the BSS is also considered.

Method embodiments of the present disclosure are described in detail above in conjunction with FIG. 2 to FIG. 10, and apparatus embodiments of the present disclosure are described in detail below in conjunction with FIG. 11 to FIG. 14. It should be understood that the apparatus embodiments and the method embodiments correspond to each other, and similar descriptions may refer to the method embodiments.

FIG. 11 is a structural schematic view of the Non-AP STA 600 according to an embodiment of the present disclosure. The Non-AP STA 600 includes a processing unit 610, configured to determine to perform channel access in the restricted target wake time (r-TWT) service period by using the first enhanced distributed channel access (EDCA)

parameter, according to the first information, and/or, determine to perform channel access outside the r-TWT service period by using the second EDCA parameter, according to the first information.

The first information includes at least one of: the type of the r-TWT service period, being the trigger-enable service period or the non-trigger-enable service period; the role of the Non-AP STA, being one of: the r-TWT scheduled station and the r-TWT non-scheduled station; or whether the Non-AP STA is currently in scheduled or non-scheduled r-TWT service period.

In some embodiments, in response to the role of the Non-AP STA being the r-TWT scheduled station, the processing unit 610 is further configured to negotiate and determine the first EDCA parameter and/or the second EDCA parameter with the access point (AP) associated with the Non-AP STA in the process of r-TWT (membership) setup.

In some embodiments, the processing unit 610 is particularly configured to negotiate and determine the first EDCA parameter and/or the second EDCA parameter with the AP through the TWT request frame and/or the TWT response frame.

In some embodiments, the TWT element of the TWT request frame and/or the TWT response frame includes a first field configured to indicate the first EDCA parameter, and/or a second field configured to indicate the second EDCA parameter.

In some embodiments, the TWT element of the TWT request frame and/or the TWT response frame further includes a third field, including first identification information and second identification information. The first identification information is configured to indicate whether the first field is present in the TWT element, and the second identification information is configured to indicate whether the second field is present in the TWT element.

In some embodiments, the first field is the EDCA parameter set field of the scheduled service period, the second field is the EDCA parameter set field outside a service period, and the third field is the EDCA parameter set information control field.

In some embodiments, the TWT element of the TWT request frame and/or the TWT response frame includes the restricted TWT EDCA parameter set information fields, including the EDCA parameter set field of the scheduled service period, the EDCA parameter set field outside the service period, and the EDCA parameter set information control field.

In some embodiments, the TWT element of the TWT request frame and/or the TWT response frame includes a fourth field, configured to indicate the first EDCA parameter and/or the second EDCA parameter.

In some embodiments, the TWT element of the TWT request frame and/or the TWT response frame includes a fifth field, including third identification information, wherein the third identification information is configured to indicate whether the fourth field is present in the TWT element.

In some embodiments, the fourth field is the restricted TWT EDCA parameter set information field, and the fifth field is the broadcast TWT information field. The TWT element of the TWT request frame and/or the TWT response frame includes the broadcast TWT parameter set fields, including the restricted TWT EDCA parameter set information field and the broadcast TWT information field.

In some embodiments, in response to the role of the Non-AP STA being the r-TWT scheduled station, or, the role of the Non-AP STA being the r-TWT non-scheduled station, the Non-AP STA 600 further includes a communication unit 620 configured to receive a management frame sent by the AP associated with the Non-AP STA. The management frame is configured to announce the first EDCA parameter and/or the second EDCA parameter.

In some embodiments, the management frame includes at least one of: the specified beacon frame, the probe response frame, or the association response frame.

In some embodiments, a management information base (MIB) attribute variable is maintained by the Non-AP STA in the MIB, and includes at least one of: the MIB attribute variable of the EDCA parameter value in the r-TWT scheduled service period when being the r-TWT scheduled station, the MIB attribute variable of the EDCA parameter value outside the r-TWT scheduled service period when being the r-TWT scheduled station, the MIB attribute variable of the EDCA parameter value in the r-TWT non-scheduled service period when being the r-TWT non-scheduled station, or the MIB attribute variable of the EDCA parameter value outside the r-TWT non-scheduled service period when being the r-TWT non-scheduled station.

In some embodiments, the processing unit 610 is further configured to update the MIB attribute variable maintained in the MIB according to the received EDCA parameter.

In some embodiments, the processing unit 610 is particularly configured to: update the MIB attribute variable of the EDCA parameter value in the r-TWT scheduled service period when being the r-TWT scheduled station, in response to the Non-AP STA receiving the EDCA parameter of the r-TWT scheduled station in the r-TWT scheduled service period; and/or, update the MIB attribute variable of the EDCA parameter value outside the r-TWT scheduled service period when being the r-TWT scheduled station, in response to the Non-AP STA receiving the EDCA parameter of the r-TWT scheduled station outside the r-TWT scheduled service period; and/or, update the MIB attribute variable of the EDCA parameter value in the r-TWT non-scheduled service period when being the r-TWT non-scheduled station, in response to the Non-AP STA receiving the EDCA parameter of the r-TWT non-scheduled station in the r-TWT non-scheduled service period; and/or, update the MIB attribute variable of the EDCA parameter value outside the r-TWT non-scheduled service period when being the r-TWT non-scheduled station, in response to the Non-AP STA receiving the EDCA parameter of the r-TWT non-scheduled station outside the r-TWT non-scheduled service period.

In some embodiments, in response to the role of the Non-AP STA being the r-TWT scheduled station and the type of the r-TWT service period being the trigger-enable service period, the first EDCA parameter is configured to: ensure that the Non-AP STA is unable or difficult to obtain a channel transmission opportunity through the EDCA channel access mechanism in the r-TWT service period; and/or, ensure that the AP associated with the Non-AP STA obtains a transmission opportunity through the EDCA channel access mechanism to schedule transmission of the Non-AP STA in the r-TWT service period; and/or, ensure that the AP associated with the Non-AP STA only schedules the low latency service flow of the access category (AC) or the traffic identifier (TID) corresponding to r-TWT in the r-TWT service period; or, ensure that the AP associated with the Non-AP STA preferentially schedules the low latency service flow of the AC or the TID corresponding to r-TWT in the r-TWT service period.

In some embodiments, in response to the role of the Non-AP STA being the r-TWT scheduled station and the type of the r-TWT service period being the non-trigger-enable service period, the first EDCA parameter is configured to: ensure that the Non-AP STA obtains a channel transmission opportunity through the EDCA channel access mechanism only for the low latency service flow of the AC or the TID corresponding to r-TWT in the r-TWT service period; or, ensure that the Non-AP STA obtains a channel transmission opportunity through the EDCA channel access mechanism preferentially for the low latency service flow of the AC or the TID corresponding to r-TWT in the r-TWT service period.

In some embodiments, in response to the role of the Non-AP STA being the r-TWT scheduled station, the second EDCA parameter is configured to ensure that the Non-AP STA obtains a channel transmission opportunity through the EDCA channel access mechanism more difficult than the station that do not use the r-TWT service period to transmit, outside the r-TWT service period.

In some embodiments, in response to the role of the Non-AP STA being the r-TWT non-scheduled station, the first EDCA parameter is configured to ensure that the Non-AP STA is unable or difficult to obtain the channel transmission opportunity through the EDCA channel access mechanism in the r-TWT service period; or the second EDCA parameter is configured to ensure that the Non-AP STA obtains the channel transmission opportunity through the EDCA channel access mechanism more easily than the r-TWT scheduled station outside the r-TWT service period.

In some embodiments, in response to the non-r-TWT station supporting the quiet element and being in the quiet state in the r-TWT service period, a EDCA parameter of the non-r-TWT station is configured to ensure that the non-r-TWT station obtains a channel transmission opportunity through the EDCA channel access mechanism more easily than the r-TWT scheduled station outside the r-TWT service period.

In some embodiments, in response to the non-r-TWT station un-supporting the quiet element or being in the quiet state in the r-TWT service period, and the non-r-TWT station supporting different EDCA parameters at different time intervals, a EDCA parameter of the non-r-TWT station is configured to: ensure that the non-r-TWT station is unable or difficult to obtain the channel transmission opportunity through a EDCA channel access mechanism in the r-TWT service period; and/or, ensure that the non-r-TWT station obtains the channel transmission opportunity through the EDCA channel access mechanism more easily than the r-TWT scheduled station outside the r-TWT service period.

In some embodiments, in response to the non-r-TWT station un-supporting the quiet element or being in the quiet state in the r-TWT service period, and the non-r-TWT station supporting different EDCA parameters at different time intervals, the non-r-TWT station is prohibited from performing association access; or, the non-r-TWT station is prohibited from performing channel access through a EDCA channel access mechanism; or, the EDCA parameter of the non-r-TWT station is configured to ensure that the non-r-TWT station is difficult to obtain the channel transmission opportunity through the EDCA channel access mechanism in the r-TWT service period and outside the r-TWT service period; or, the EDCA parameter of the non-r-TWT station is configured to ensure that the non-r-TWT station is unable or more difficult to obtain the channel transmission opportunity through the EDCA channel access mechanism than the r-TWT scheduled station in the r-TWT service period; and/or, the EDCA parameter of the non-r-TWT station is configured to ensure that the non-r-TWT station obtains the channel transmission opportunity through the EDCA channel access mechanism more easily than the r-TWT scheduled station outside the r-TWT service period.

In some embodiments, the EDCA parameter of the non-r-TWT station is represented by the EDCA parameter set element or the multi-user EDCA parameter set element.

In some embodiments, the first EDCA parameter is represented by an EDCA parameter set element or a multi-user EDCA parameter set element, and/or, the second EDCA parameter is represented by the EDCA parameter set element or the multi-user EDCA parameter set element.

In some embodiments, the communication unit may be a communication interface or a transceiver, or an input/output interface of a communication chip or a system-on-chip. The processing unit may be one or more processors.

It should be understood that the Non-AP STA 600 according to the embodiments of the present disclosure may correspond to the Non-AP STA in the method embodiments of the present disclosure, and the above and other operations and/or functions of each unit in the Non-AP STA 600 are respectively for implementing the corresponding flow of the Non-AP STA in the method 200 shown in FIG. 2 to FIG. 7, and are not repeated here for brevity.

Figures 12, 13, 14:
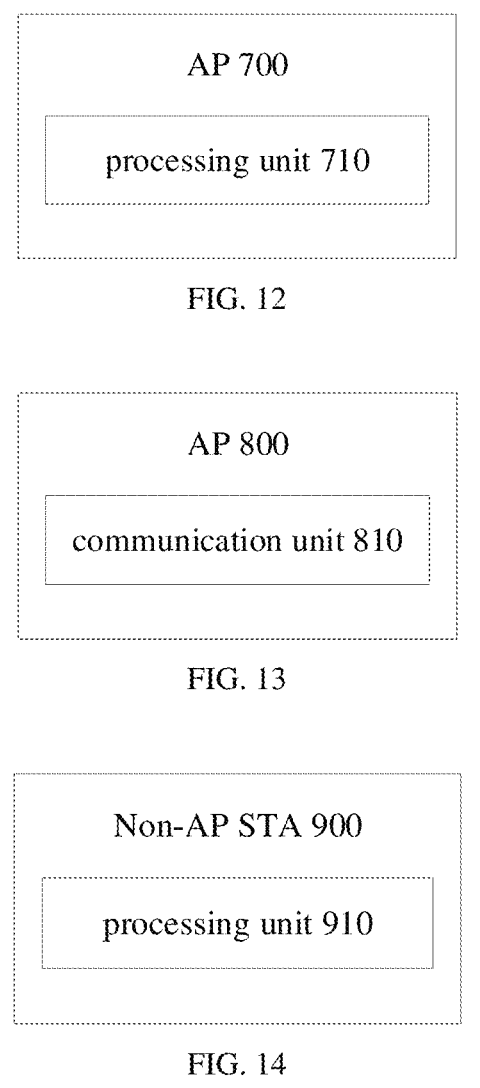

FIG. 12 illustrates a structural schematic view of the AP 700 according to an embodiment of the present disclosure. The AP 700 includes a processing unit 710, configured to negotiate and determine a first enhanced distributed channel access (EDCA) parameter and/or a second EDCA parameter for the non-access point station (Non-AP STA) with the Non-AP STA associated with the AP. The first EDCA parameter is configured for the Non-AP STA to perform channel access in the restricted target wake time (r-TWT) service period, and the second EDCA parameter is configured for the Non-AP STA to perform channel access outside the r-TWT service period.

In some embodiments, the Non-AP STA is the r-TWT scheduled station.

In some embodiments, the processing unit 710 is particularly configured to negotiate and determine the first EDCA parameter and/or the second EDCA parameter for the Non-AP STA with the Non-AP STA through the TWT request frame and/or the TWT response frame in the process of r-TWT (membership) setup.

In some embodiments, the TWT element of the TWT request frame and/or the TWT response frame includes a first field configured to indicate the first EDCA parameter, and/or a second field configured to indicate the second EDCA parameter.

In some embodiments, the TWT element of the TWT request frame and/or the TWT response frame further includes a third field, including first identification information and second identification information. The first identification information is configured to indicate whether the first field is present in the TWT element, and the second identification information is configured to indicate whether the second field is present in the TWT element.

In some embodiments, the first field is the EDCA parameter set field of the scheduled service period, the second field is the EDCA parameter set field outside the service period, and the third field is the EDCA parameter set information control field.

In some embodiments, the TWT element of the TWT request frame and/or the TWT response frame includes restricted TWT EDCA parameter set information fields, including the EDCA parameter set field of the scheduled service period, the EDCA parameter set field outside the service period, and the EDCA parameter set information control field.

In some embodiments, the TWT element of the TWT request frame and/or the TWT response frame includes a fourth field, configured to indicate the first EDCA parameter and/or the second EDCA parameter.

In some embodiments, the TWT element of the TWT request frame and/or the TWT response frame includes a fifth field, including third identification information, and the third identification information is configured to indicate whether the fourth field is present in the TWT element.

In some embodiments, the fourth field is the restricted TWT EDCA parameter set information field, and the fifth field is the broadcast TWT information field. The TWT element of the TWT request frame and/or the TWT response frame includes broadcast TWT parameter set fields, including the restricted TWT EDCA parameter set information field and the broadcast TWT information field.

In some embodiments, the first EDCA parameter is represented by the EDCA parameter set element or the multi-user EDCA parameter set element, and/or, the second EDCA parameter is represented by the EDCA parameter set element or the multi-user EDCA parameter set element.

In some embodiments, the processing unit may be one or more processors.

It should be understood that the AP 700 according to the embodiments of the present disclosure may correspond to the AP in the method embodiments of the present disclosure, and the above and other operations and/or functions of each unit in the AP 700 are respectively for implementing the corresponding flow of the AP in the method 300 shown in FIG. 8, and are not repeated here for brevity.

FIG. 13 illustrates a structural schematic view of the AP 800 according to an embodiment of the present disclosure. The AP 800 includes a communication unit 810, configured to send a management frame to the non-access point station (Non-AP STA). The management frame is configured to announce at least one of: the enhanced distributed channel access (EDCA) parameter of the restricted target wake time (r-TWT) scheduled station in the r-TWT scheduled service period, the EDCA parameter of the r-TWT scheduled station outside the r-TWT scheduled service period, the EDCA parameter of the r-TWT non-scheduled station in the r-TWT non-scheduled service period, or the EDCA parameter of the r-TWT non-scheduled station outside the r-TWT non-scheduled service period.

In some embodiments, the Non-AP STA is the r-TWT scheduled station, or the Non-AP STA is the r-TWT non-scheduled station.

In some embodiments, the management frame includes at least one of: the specified beacon frame, the probe response frame, or the association response frame.

In some embodiments, the EDCA parameter is represented by an EDCA parameter set element or a multi-user EDCA parameter set element.

In some embodiments, the communication unit may be the communication interface or the transceiver, or the input/output interface of the communication chip or the system-on-chip.

It should be understood that the AP 800 according to the embodiments of the present disclosure may correspond to the AP in the method embodiments of the present disclosure, and the above and other operations and/or functions of each unit in the AP 800 are respectively for implementing the corresponding flow of the AP in the method 400 shown in FIG. 9, and are not repeated here for brevity.

FIG. 14 illustrates a structural schematic view of a Non-AP STA 900 according to an embodiment of the present disclosure. The Non-AP STA 900 includes a processing unit 910, configured to perform the first operation in the restricted target wake time (r-TWT) service period, according to the second information. The first operation includes at least one of: executing the backoff process, pausing the execution of the backoff process, starting the backoff process, pausing the startup of the backoff process, stopping the execution of the backoff process, or stopping channel access. The second information includes at least one of: the type of the r-TWT service period, being the trigger-enable service period or the non-trigger-enable service period; the role of the Non-AP STA, being one of: the r-TWT scheduled station and the r-TWT non-scheduled station; or whether the Non-AP STA is currently in the scheduled or non-scheduled r-TWT service period.

In some embodiments, in response to the role of the Non-AP STA being the r-TWT scheduled station, the type of the r-TWT service period being the non-trigger-enable service period, and the r-TWT scheduled station being allowed to perform channel access based on an enhanced distributed channel access (EDCA) rule in the r-TWT service period, the processing unit 910 is particularly configured to: pause the startup or the execution of the backoff process, in response to a service data transmitted in the r-TWT service period being allowed to be empty in a transmission queue associated with the first AC, or a traffic identifier (TID) transmitted in the r-TWT service period being allowed to have no corresponding frame to be transmitted, for the first access category (AC), and starts or executes the backoff process, in response to the service data transmitted in the r-TWT service period being allowed to be not empty in the transmission queue, or the traffic identifier (TID) transmitted in the r-TWT service period being allowed to have a corresponding frame to be transmitted; or, pause the startup or the execution of the backoff process in the r-TWT service period for a second AC; or start or execute the backoff process, in response to the service data transmitted in the r-TWT service period being allowed to be empty in a transmission queue associated with the first AC, or a traffic identifier (TID) transmitted in the r-TWT service period being allowed to have no corresponding frame to be transmitted, and the second AC has a data frame to be transmitted, for the second AC; and/or, pause the startup or the execution of the backoff process for the second AC, in response to the service data transmitted in the r-TWT service period being allowed to be not empty in the transmission queue associated with the first AC, or the traffic identifier (TID) transmitted in the r-TWT service period being allowed to have a corresponding frame to be transmitted. The first AC is the AC corresponding to the type of the service data that is allowed to be transmitted in the r-TWT service period, and the second AC is the AC corresponding to the type of the service data that is not allowed to be transmitted in the r-TWT service period.

In some embodiments, the first AC is the AC corresponding to the low latency service, and the second AC is the AC corresponding to the non-low latency service.

In some embodiments, the TID allowed to be transmitted in the r-TWT service period is the TID corresponding to the specified low latency service in the process of r-TWT (membership) setup.

In some embodiments, in response to the role of the Non-AP STA being the r-TWT non-scheduled station, and the type of the r-TWT service period being the non-trigger-enable service period, the Non-AP STA stops performing channel access based on the EDCA rule in the r-TWT service period, which includes stopping the backoff process in the r-TWT service period, or un-performing transmission to the wireless medium in the r-TWT service period by setting a corresponding network allocation vector (NAV).

In some embodiments, in response to the role of the Non-AP STA being the r-TWT scheduled station, the type of the r-TWT service period being the trigger-enable service period, and the r-TWT scheduled station being not allowed to perform channel access based on the EDCA rule in the r-TWT service period, the processing unit 910 is particularly configured to stop the backoff process in the r-TWT service period, and send the trigger-based physical layer protocol data unit (PPDU) according to indication information of the trigger frame, when the Non-AP STA receives the trigger frame sent by the access point (AP) associated with the Non-AP STA.

In some embodiments, in response to the role of the Non-AP STA being the r-TWT non-scheduled station, the Non-AP STA stops performing channel access based on the EDCA rule in the r-TWT service period, which includes: stopping the backoff process in the r-TWT service period, or un-performing transmission to the wireless medium in the r-TWT service period by setting a corresponding NAV.

In some embodiments, the backoff process is the EDCA backoff process.

In some embodiments, the processing unit may be one or more processors.

It should be understood that the Non-AP STA 900 according to the embodiments of the present disclosure may correspond to the Non-AP STA in the method embodiments of the present disclosure, and the above and other operations and/or functions of each unit in the Non-AP STA 900 are respectively for implementing the corresponding flow of the Non-AP STA in the method 500 shown in FIG. 10, and are not repeated here for brevity.

Figure 15:
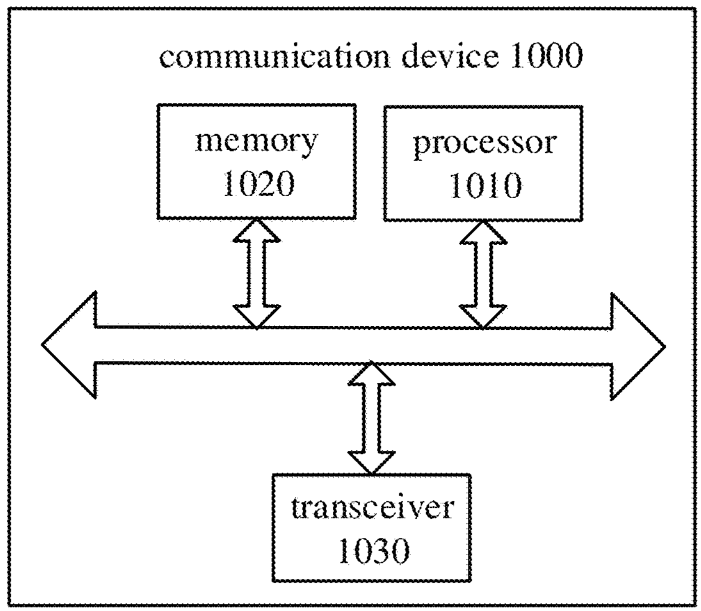
FIG. 15 is a structural schematic view of a communication device according to an embodiment of the present disclosure.

FIG. 15 is a structural schematic view of a communication device 1000 according to an embodiment of the present disclosure. The communication device 1000 shown in FIG. 15 includes a processor 1010, and the processor 1010 can call and run a computer program from a memory to implement the method in the embodiments of the present disclosure.

In some embodiments, as shown in FIG. 15. The communication device 1000 may also include a memory 1020. The processor 1010 can call and run the computer program from the memory 1020 to implement the method in the embodiments of the present disclosure.

The memory 1020 may be a separate device from the processor 1010 or may be integrated in the processor 1010.

In some embodiments, as shown in FIG. 15. The communication device 1000 may also include a transceiver 1030. The processor 1010 can control the transceiver 1030 to communicate with other devices, for example, to transmit information or data to other devices, or receive information or data transmitted by other devices.

The transceiver 1030 may include a transmitter and a receiver. The transceiver 1030 may further include antennas, and number of the antennas may be one or more.

In some embodiments, the communication device 1000 may be the Non-AP STA in the embodiments of the present disclosure, and the communication device 1000 may implement the corresponding flow implemented by the Non-AP STA of each method in the embodiments of the present disclosure, and is not repeated here for brevity.

In some embodiments, the communication device 1000 may be the AP in the embodiments of the present disclosure, and the communication device 1000 may implement the corresponding flow implemented by the AP of each method in the embodiments of the present disclosure, and is not repeated here for brevity.

Figure 16:
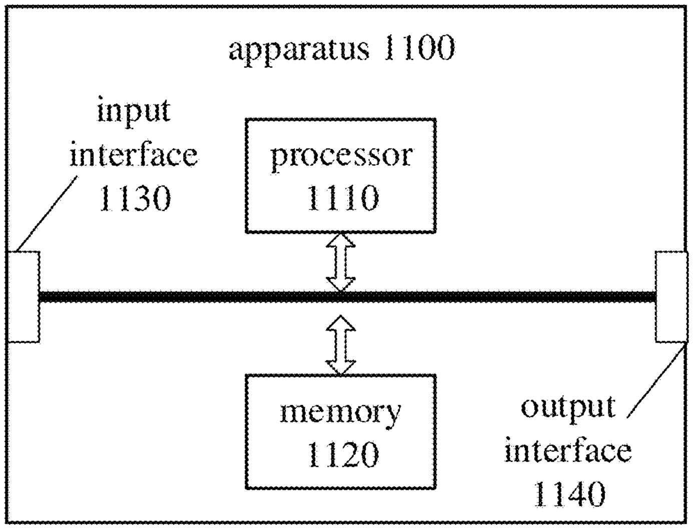
FIG. 16 is a structural schematic view of an apparatus according to an embodiment of the present disclosure.

FIG. 16 is a structural schematic view of an apparatus according to an embodiment of the present disclosure. The apparatus 1100 shown in FIG. 16 includes a processor 1110, and the processor 1110 can call and run a computer program from a memory to implement the method in the embodiments of the present disclosure.

In some embodiments, as shown in FIG. 16. The apparatus 1100 may also include a memory 1120. The processor 1110 can call and run the computer program from the memory 1120 to implement the method in the embodiments of the present disclosure.

The memory 1120 may be a separate device from the processor 1110 or may be integrated in the processor 1110.

In some embodiments, the apparatus 1100 may also include an input interface 1130. The processor 1110 can control the input interface 1130 to communicate with other devices, for example, to obtain information or data transmitted by other devices.

In some embodiments, the apparatus 1100 may also include an output interface 1140. The processor 1110 can control the output interface 1140 to communicate with other devices, for example, to transmit information or data to other devices.

In some embodiments, the apparatus can be applied to the Non-AP STA in the embodiments of the present disclosure, and the apparatus may implement the corresponding flow implemented by the Non-AP STA of each method in the embodiments of the present disclosure, and is not repeated here for brevity.

In some embodiments, the apparatus can be applied to the AP in the embodiments of the present disclosure, and the apparatus may implement the corresponding flow implemented by the AP of each method in the embodiments of the present disclosure, and is not repeated here for brevity.

In some embodiments, the apparatus mentioned in the embodiments of the present disclosure may also be a chip, such as a system-on-chip.

Figure 17:
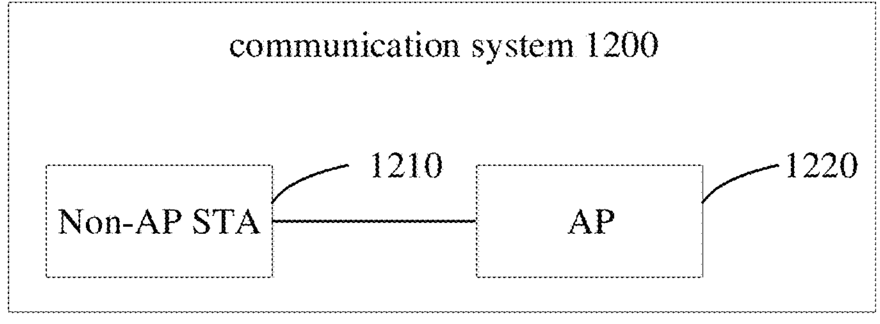
FIG. 17 is a structural schematic view of a communication system according to an embodiment of the present disclosure.

FIG. 17 is a structural schematic view of a communication system 1200 according to an embodiment of the present disclosure. The communication system 1200 includes the Non-AP STA 1210 and the AP 1220.

Wherein, the Non-AP STA 1210 may be configured to implement the corresponding functions implemented by the Non-AP STA in the above method, and the AP 1220 may be configured to implement the corresponding functions implemented by the AP in the above method, which are not repeated here for brevity.

It should be understood that the processor in the embodiments of the present disclosure may be an integrated circuit chip having signal processing capability. In the implementation process, each step of the above method embodiments may be implemented by an integrated logic circuit in hardware or instructions in software form in the processor. The processor may be a general purpose processor, a digital signal processor (DSP), an application specific integrated circuit (ASIC), an field programmable gate array (FPGA) or other programmable logic devices, a discrete gate or transistor logic device, or a discrete hardware component, and may implement or execute the methods, steps, and logic block diagrams disclosed in the embodiments of the present disclosure. The general purpose processor may be a microprocessor, or the processor may also be any conventional processor. The steps in conjunction with the method disclosed in the embodiments of the present disclosure may be directly embodied as being executed by a hardware decoding processor, or may be executed by a combination of a hardware and a software module in the decoding processor. The software module may be located in a non-transitory storage medium mature in the art, such as a random access memory, a flash memory, a read-only memory, a programmable read-only memory or an electrically erasable programmable memory, a register, etc. The non-transitory storage medium is located in the memory, the processor reads the information in the memory, and completes the steps of the method in combination with hardware thereof.

It can be understood that the memory in the embodiments of the present disclosure may be a volatile memory or a non-volatile memory, or may include both volatile and non-volatile memories. Wherein, the non-volatile memory may be a read-only memory (ROM), a programmable ROM (PROM), an erasable PROM (EPROM), an electrically EPROM (EEPROM) or a flash memory. The volatile memory may be a random access memory (RAM), and the volatile memory serves as an external cache. By illustrative but not restrictive, many forms of RAM are available, for example, a static RAM (SRAM), a dynamic RAM (DRAM), a synchronous DRAM (SDRAM), an enhanced SDRAM (ESDRAM), a synchlink DRAM (SLDRAM), and a direct rambus RAM (DR RAM). It should be noted that the memory of the systems and methods described herein is intended to include, but not be limited to, these and any other suitable types of memory.

It should be understood that the memory is illustrative but not restrictive, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SL-DRAM), a direct rambus RAM (DR RAM), and etc. That is, the memory in embodiments of the present disclosure is intended to include, but not be limited to, these and any other suitable types of memory.

A non-transitory computer-readable storage medium for storing a computer program is provided in the embodiments of the present disclosure.

In some embodiments, the non-transitory computer-readable storage medium can be applied to the Non-AP STA in the embodiments of the present disclosure, and causes the computer to execute the corresponding flow implemented by the Non-AP STA of each method in the embodiments of the present disclosure, and is not repeated here for brevity.

In some embodiments, the non-transitory computer-readable storage medium can be applied to the AP in the embodiments of the present disclosure, and causes the computer to execute the corresponding flow implemented by the AP of each method in the embodiments of the present disclosure, and is not repeated here for brevity.

A computer program product is provided in the embodiments of the present disclosure, and the computer program product includes the computer program instruction.

In some embodiments, the computer program product can be applied to the Non-AP STA in the embodiments of the present disclosure, and causes the computer to execute the corresponding flow implemented by the Non-AP STA of each method in the embodiments of the present disclosure, and is not repeated here for brevity.

In some embodiments, the computer program product can be applied to the AP in the embodiments of the present disclosure, and causes the computer to execute the corresponding flow implemented by the AP of each method in the embodiments of the present disclosure, and is not repeated here for brevity.

A computer program is provided in the embodiments of the present disclosure.

In some embodiments, the computer program can be applied to the Non-AP STA in the embodiments of the present disclosure. The computer program ran in the computer causing the computer to execute the corresponding flow implemented by the Non-AP STA of each method in the embodiments of the present disclosure, and is not repeated here for brevity.

In some embodiments, the computer program can be applied to the AP in the embodiments of the present disclosure. The computer program ran in the computer causing the computer to execute the corresponding flow implemented by the AP of each method in the embodiments of the present disclosure, and is not repeated here for brevity.

Those skilled in the art may realize that the units and algorithm steps of each example described in combination with the embodiments disclosed herein can be implemented in electronic hardware, or a combination of computer software and electronic hardware. Whether these functions are executed in hardware or software depends on the application and design constraints of the technical solution. Those skilled in the art may implement the described functionality using different methods for each particular application, but such implementations should not be considered beyond the scope of the present disclosure.

Those skilled in the art can clearly understand that, for convenience and brevity of description, working processes of the systems, apparatus and units described above may refer to corresponding processes in the foregoing method embodiments, and are not repeated here.

In the several embodiments of the present disclosure, it should be understood that the systems, apparatus, and methods disclosed may be implemented in other ways. For example, the apparatus embodiments described above are merely illustrative. For example, the division of the units is only a logical functional division, and there may be other division modes in actual implementation. For example, a plurality of units or components may be combined or integrated into another system, or some features may be ignored or not executed. In another aspect, the coupling or direct coupling or communicative connection between each other shown or discussed may be indirect coupling or communicative connection through some interface, device, or unit, and may be in electrical, mechanical, or other forms.

The units described as separate elements may or may not be physically separate, and the elements shown as units may or may not be physical units, that is, the units or the elements may be located in one place or may be distributed over multiple network units. Some or all of the units may be selected according to actual needs to achieve the purpose of the solution in the embodiments.

In addition, each functional unit in each embodiment of the present disclosure may be integrated in one processing unit, or each unit may exist physically independently, or two or more units may be integrated in one unit.

The functions, if implemented in the form of software functional units and sold or used as stand-alone products, may be stored in a non-transitory computer-readable storage medium. With regard to such understanding, the technical solutions of the present disclosure essentially or a part contributing to the prior art or a part of the technical solutions may be embodied in the form of a software product. The computer software product is stored in a non-transitory storage medium and comprises a plurality of instructions for enabling a computer device (which may be a personal computer, a server, or a network device, etc.) to execute all or part of the steps of the method described in each embodiment of the present disclosure. The aforementioned non-transitory storage medium includes various media capable of storing program codes, such as a USB flash drive, a removable hard disk, a read-only memory (ROM), a random access memory (RAM), a magnetic disk, or an optical disk.

The above are only embodiments of the present disclosure, but the scope of protection of the present disclosure is not limited thereto. Changes or substitutions that any person skilled in the art may easily think of within the technical scope disclosed in the present disclosure should be covered by the scope of protection of the present disclosure. Therefore, the scope of protection of the present disclosure shall be subject to the scope of protection of the claims.

What is claimed is:

1. A wireless communication method, comprising:

determining, by a non-access point station (Non-AP STA), to perform channel access in one or more restricted target wake time (r-TWT) service periods by using a first enhanced distributed channel access (EDCA) parameter, according to first information; and/or, determining, by the Non-AP STA, to perform channel access outside the one or more r-TWT service periods by using a second EDCA parameter, according to the first information;

wherein the first information comprises at least one of:

types of the one or more r-TWT service period, being a trigger-enable service period or a non-trigger-enable service period;

a role of the Non-AP STA, being one of a r-TWT scheduled station and a r-TWT non-scheduled station; or whether the Non-AP STA is currently in a scheduled or non-scheduled r-TWT service period;

wherein a management information base (MIB) attribute variable is maintained by the Non-AP STA in a MIB, and comprises at least one of:

a MIB attribute variable of an EDCA parameter value in a r-TWT scheduled service period when being the r-TWT scheduled station, a MIB attribute variable of the EDCA parameter value outside the r-TWT scheduled service period when being the r-TWT scheduled station, a MIB attribute variable of an EDCA parameter value in a r-TWT non-scheduled service period when being the r-TWT non-scheduled station, or a MIB attribute variable of the EDCA parameter value outside the r-TWT non-scheduled service period when being the r-TWT non-scheduled station.

2. The method according to claim 1, in response to the role of the Non-AP STA being the r-TWT scheduled station, further comprising:

negotiating and determining, by the Non-AP STA, the first EDCA parameter and/or the second EDCA parameter with an access point (AP) associated with the Non-AP STA in a process of r-TWT (membership) setup.

3. The method according to claim 2, wherein the negotiating and determining, by the Non-AP STA, the first EDCA parameter and/or the second EDCA parameter with the AP associated with the Non-AP STA, comprises:

negotiating and determining the first EDCA parameter and/or the second EDCA parameter with the AP through a TWT request frame and/or a TWT response frame.

4. The method according to claim 3, wherein a TWT element of the TWT request frame and/or the TWT response frame comprises:

a first field, configured to indicate the first EDCA parameter, and/or a second field, configured to indicate the second EDCA parameter;

a third field, comprising:

first identification information, configured to indicate whether the first field is present in the TWT element, and second identification information, configured to indicate whether the second field is present in the TWT element;

wherein the first field is an EDCA parameter set field of a scheduled service period, the second field is an EDCA parameter set field outside the scheduled service period, and the third field is an EDCA parameter set information control field;

wherein the TWT element of the TWT request frame and/or the TWT response frame comprises:

restricted TWT EDCA parameter set information fields, comprising:

the EDCA parameter set field of the scheduled service period, the EDCA parameter set field outside the scheduled service period, and the EDCA parameter set information control field.

5. The method according to claim 3, wherein the TWT element of the TWT request frame and/or the TWT response frame comprises:

a fourth field, configured to indicate the first EDCA parameter and/or the second EDCA parameter;

a fifth field, comprising:

third identification information, configured to indicate whether the fourth field is present in the TWT element;

wherein the fourth field is a restricted TWT EDCA parameter set information field, and the fifth field is a broadcast TWT information field;

the TWT element of the TWT request frame and/or the TWT response frame comprises:

broadcast TWT parameter set fields, comprising:

the restricted TWT EDCA parameter set information field, and the broadcast TWT information field.

6. The method according to claim 1, further comprising:

updating, by the Non-AP STA, the MIB attribute variable maintained in the MIB according to a received EDCA parameter, wherein the updating, by the Non-AP STA, the MIB attribute variable maintained in the MIB according to a received EDCA parameter, comprises:

updating, by the Non-AP STA, the MIB attribute variable of the EDCA parameter value in the r-TWT scheduled service period when being the r-TWT scheduled station, in response to receiving the EDCA parameter of the r-TWT scheduled station in the r-TWT scheduled service period; and/or, updating, by the Non-AP STA, the MIB attribute variable of the EDCA parameter value outside the r-TWT scheduled service period when being the r-TWT scheduled station, in response to receiving the EDCA parameter of the r-TWT scheduled station outside the r-TWT scheduled service period; and/or, updating, by the Non-AP STA, the MIB attribute variable of the EDCA parameter value in the r-TWT non-scheduled service period when being the r-TWT non-scheduled station, in response to receiving the EDCA parameter of the r-TWT non-scheduled station in the r-TWT non-scheduled service period; and/or, updating, by the Non-AP STA, the MIB attribute variable of the EDCA parameter value outside the r-TWT non-scheduled service period when being the r-TWT non-scheduled station, in response to receiving the EDCA parameter of the r-TWT non-scheduled station outside the r-TWT non-scheduled service period.

7. The method according to claim 1, wherein in response to the role of the Non-AP STA being the r-TWT scheduled station and the types of the one or more r-TWT service periods being the trigger-enable service period, the first EDCA parameter is configured to:

ensure that the Non-AP STA is unable or difficult to obtain a channel transmission opportunity through an EDCA channel access mechanism in the one or more r-TWT service periods; and/or, ensure that an AP associated with the Non-AP STA obtains a transmission opportunity through the EDCA channel access mechanism to schedule transmission of the Non-AP STA in the one or more r-TWT service periods; and/or, ensure that the AP associated with the Non-AP STA only schedules a low latency service flow of an access category (AC) or a traffic identifier (TID) corresponding to r-TWT in the one or more r-TWT service periods; or ensure that the AP associated with the Non-AP STA preferentially schedules the low latency service flow of the AC or the TID corresponding to r-TWT in the one or more r-TWT service periods;

wherein in response to the role of the Non-AP STA being the r-TWT scheduled station and the types of the one or more r-TWT service periods being the non-trigger-enable service period, the first EDCA parameter is configured to:

ensure that the Non-AP STA obtains a channel transmission opportunity through an EDCA channel access mechanism only for a low latency service flow of an AC or a TID corresponding to r-TWT in the one or more r-TWT service periods; or, ensure that the Non-AP STA obtains a channel transmission opportunity through the EDCA channel access mechanism preferentially for the low latency service flow of the AC or the TID corresponding to r-TWT in the one or more r-TWT service periods;

wherein in response to the role of the Non-AP STA being the r-TWT scheduled station, the second EDCA parameter is configured to ensure that the Non-AP STA obtains a channel transmission opportunity through an EDCA channel access mechanism more difficult than a station that do not use the one or more r-TWT service periods to transmit, outside the one or more r-TWT service periods.

8. The method according to claim 1, wherein in response to the role of the Non-AP STA being the r-TWT non-scheduled station, the first EDCA parameter is configured to ensure that the Non-AP STA is unable or difficult to obtain a channel transmission opportunity through an EDCA channel access mechanism in the one or more r-TWT service periods; or the second EDCA parameter is configured to ensure that the Non-AP STA obtains the channel transmission opportunity through the EDCA channel access mechanism more easily than the r-TWT scheduled station outside the one or more r-TWT service periods.

9. The method according to claim 1, wherein a EDCA parameter of a non-r-TWT station is configured to ensure that the non-r-TWT station obtains a channel transmission opportunity through a EDCA channel access mechanism more easily than the r-TWT scheduled station outside the one or more r-TWT service periods, in response to the non-r-TWT station supporting a quiet element and being in a quiet state in the one or more r-TWT service periods;

wherein in response to a non-r-TWT station un-supporting a quiet element or being in a quiet state in the one or more r-TWT service periods, and the non-r-TWT station supporting different EDCA parameters at different time intervals, an EDCA parameter of the non-r-TWT station is configured to:

ensure that the non-r-TWT station is unable or difficult to obtain a channel transmission opportunity through a EDCA channel access mechanism in the one or more r-TWT service periods; and/or, ensure that the non-r-TWT station obtains the channel transmission opportunity through the EDCA channel access mechanism more easily than the r-TWT scheduled station outside the one or more r-TWT service periods;

wherein in response to a non-r-TWT station un-supporting a quiet element or being in a quiet state in the one or more r-TWT service periods, and the non-r-TWT station supporting different EDCA parameters at different time intervals, the non-r-TWT station is prohibited from performing association access; or, the non-r-TWT station is prohibited from performing channel access through a EDCA channel access mechanism; or, a EDCA parameter of the non-r-TWT station is configured to ensure that the non-r-TWT station is difficult to obtains a channel transmission opportunity through the EDCA channel access mechanism in the r-TWT service period and outside the one or more r-TWT service periods; or, the EDCA parameter of the non-r-TWT station is configured to ensure that the non-r-TWT station is unable or more difficult to obtain the channel transmission opportunity through the EDCA channel access mechanism than the r-TWT scheduled station in the one or more r-TWT service periods; and/or, the EDCA parameter of the non-r-TWT station is configured to ensure that the non-r-TWT station obtains the channel transmission opportunity through the EDCA channel access mechanism more easily than the r-TWT scheduled station outside the one or more r-TWT service periods.

10. The method according to claim 9, wherein the EDCA parameter of the non-r-TWT station is represented by an EDCA parameter set element or a multi-user EDCA parameter set element.

11. The method according to claim 1, wherein the first EDCA parameter is represented by an EDCA parameter set element or a multi-user EDCA parameter set element, and/or, the second EDCA parameter is represented by the EDCA parameter set element or the multi-user EDCA parameter set element.

12. The method according to claim 1, further comprising:

performing, by the Non-AP STA, a first operation in one or more r-TWT service periods, according to second information;

wherein the first operation comprises at least one of:

executing a backoff process, pausing an execution of the backoff process, starting the backoff process, pausing a startup of the backoff process, stopping the execution of the backoff process, or stopping channel access;

the second information comprises at least one of:

types of the one or more r-TWT service period, being a trigger-enable service period or a non-trigger-enable service period;

a role of the Non-AP STA, being one of a r-TWT scheduled station and a r-TWT non-scheduled station; or whether the Non-AP STA is currently in a scheduled or non-scheduled r-TWT service period.

13. The method according to claim 12, wherein in response to the role of the Non-AP STA being the r-TWT scheduled station, the types of the one or more r-TWT service period being the non-trigger-enable service period, and the r-TWT scheduled station being allowed to perform channel access based on an enhanced distributed channel access (EDCA) rule in the one or more r-TWT service periods, the performing a first operation in one or more restricted target wake time (r-TWT) service periods, according to second information, comprises:

for a first access category (AC), in response to a service data transmitted in the one or more r-TWT service periods being allowed to be empty in a transmission queue associated with the first AC, or a traffic identifier (TID) transmitted in the one or more r-TWT service periods being allowed to have no corresponding frame to be transmitted, pausing, by the Non-AP STA, the startup or the execution of the backoff process, and in response to the service data transmitted in the one or more r-TWT service periods being allowed to be not empty in the transmission queue, or the traffic identifier (TID) transmitted in the one or more r-TWT service periods being allowed to have a corresponding frame to be transmitted, starting or executing the backoff process; or, for a second AC, pausing, by the Non-AP STA, the startup or the execution of the backoff process in the one or more r-TWT service periods; or, for the second AC, in response to the service data transmitted in the one or more r-TWT service periods being allowed to be empty in a transmission queue associated with the first AC, or a traffic identifier (TID) transmitted in the one or more r-TWT service periods being allowed to have no corresponding frame to be transmitted, and the second AC has a data frame to be transmitted, starting or executing, by the Non-AP STA, the backoff process; and/or in response to the service data transmitted in the one or more r-TWT service periods being allowed to be not empty in the transmission queue associated with the first AC, or the traffic identifier (TID) transmitted in the one or more r-TWT service periods being allowed to have a corresponding frame to be transmitted, pausing, by the Non-AP STA, the startup or the execution of the backoff process for the second AC;

wherein the first AC is an AC corresponding to a type of the service data that is allowed to be transmitted in the one or more r-TWT service periods, and the second AC is an AC corresponding to a type of the service data that is not allowed to be transmitted in the one or more r-TWT service periods.

14. The method according to claim 13, wherein the first AC is an AC corresponding to a low latency service, and the second AC is an AC corresponding to a non-low latency service;

or, the TID allowed to be transmitted in the r-TWT service period is a TID corresponding to a specified low latency service in a process of r-TWT (membership) setup.

15. The method according to claim 12, wherein in response to the role of the Non-AP STA being the r-TWT non-scheduled station, and the types of the one or more r-TWT service period being the non-trigger-enable service period, stopping performing channel access based on a EDCA rule in the r-TWT service period, comprises:

stopping, by the Non-AP STA, the backoff process in the r-TWT service period, or un-performing transmission, by the Non-AP STA, to a wireless medium in the one or more r-TWT service periods by setting a corresponding network allocation vector (NAV).

16. The method according to claim 12, wherein in response to the role of the Non-AP STA being the r-TWT scheduled station, the types of the one or more r-TWT service periods being the trigger-enable service period, and the r-TWT scheduled station being not allowed to perform channel access based on the EDCA rule in the r-TWT service period, the performing a first operation in one or more restricted target wake time (r-TWT) service periods, according to second information, comprises:

stopping, by the Non-AP STA, the backoff process in the one or more r-TWT service periods, and sending, by the Non-AP STA, a trigger-based physical layer protocol data unit (PPDU), according to indication information of a trigger frame, in response to receiving the trigger frame sent by an AP associated with the Non-AP STA;

wherein in response to the role of the Non-AP STA being the r-TWT non-scheduled station, stopping performing channel access based on a EDCA rule in the one or more r-TWT service periods, comprises:

stopping, by the Non-AP STA, the backoff process in the one or more r-TWT service periods, or un-performing transmission, by the Non-AP STA, to a wireless medium in the one or more r-TWT service periods by setting a corresponding network allocation vector (NAV).

17. A Non-AP STA, comprising:

a processor, configured to store a computer program, and a processor, configured to call and run the computer program stored in the memory, performing:

determining to perform channel access in one or more restricted target wake time (r-TWT) service periods by using a first enhanced distributed channel access (EDCA) parameter, according to first information; and/or, determining to perform channel access outside the one or more r-TWT service periods by using a second EDCA parameter, according to the first information;

wherein the first information comprises at least one of:

types of the one or more r-TWT service period, being a trigger-enable service period or a non-trigger-enable service period;

a role of the Non-AP STA, being one of a r-TWT scheduled station and a r-TWT non-scheduled station; or whether the Non-AP STA is currently in a scheduled or non-scheduled r-TWT service period;

wherein a management information base (MIB) attribute variable is maintained by the Non-AP STA in a MIB, and comprises at least one of:

a MIB attribute variable of an EDCA parameter value in a r-TWT scheduled service period when being the r-TWT scheduled station, a MIB attribute variable of the EDCA parameter value outside the r-TWT scheduled service period when being the r-TWT scheduled station, a MIB attribute variable of an EDCA parameter value in a r-TWT non-scheduled service period when being the r-TWT non-scheduled station, or a MIB attribute variable of the EDCA parameter value outside the r-TWT non-scheduled service period when being the r-TWT non-scheduled station.

18. A non-transitory computer-readable storage medium, configured to store a computer program, wherein the computer program enables a computer to perform:

determining to perform channel access in one or more restricted target wake time (r-TWT) service periods by using a first enhanced distributed channel access (EDCA) parameter, according to first information; and/or, determining to perform channel access outside the one or more r-TWT service periods by using a second EDCA parameter, according to the first information;

wherein the first information comprises at least one of:

types of the one or more r-TWT service period, being a trigger-enable service period or a non-trigger-enable service period;

a role of a non-access point station (Non-AP STA), being one of a r-TWT scheduled station and a r-TWT non-scheduled station; or whether the Non-AP STA is currently in a scheduled or non-scheduled r-TWT service period;

wherein a management information base (MIB) attribute variable is maintained by the Non-AP STA in a MIB, and comprises at least one of:

a MIB attribute variable of an EDCA parameter value in a r-TWT scheduled service period when being the r-TWT scheduled station, a MIB attribute variable of the EDCA parameter value outside the r-TWT scheduled service period when being the r-TWT scheduled station, a MIB attribute variable of an EDCA parameter value in a r-TWT non-scheduled service period when being the r-TWT non-scheduled station, or a MIB attribute variable of the EDCA parameter value outside the r-TWT non-scheduled service period when being the r-TWT non-scheduled station.

* * * * *